United States Patent
Sinha et al.

(10) Patent No.: US 8,219,230 B2
(45) Date of Patent: Jul. 10, 2012

(54) MANUFACTURABILITY EVALUATION OF INJECTION MOLDED PLASTIC MODELS USING A CAD BASED DFX EVALUATION SYSTEM

(75) Inventors: Bhaskar Sinha, Pune (IN); Ashish Patil, Pune (IN); Ajay Deshpande, Pune (IN); Alpana Sharma, Pune (IN); Christine Zuzart, Pune (IN); Sameer Kondejkar, Pune (IN); Rajesh Jain, Bangalore (IN); Nitin Umap, Mumbai (IN); Rahul Rajadhyaksha, Thane (IN)

(73) Assignee: Geometric Limited, Mumbai (IN)

( * ) Notice: Subject to any disclaimer, the term of this patent is extended or adjusted under 35 U.S.C. 154(b) by 260 days.

(21) Appl. No.: 12/797,002

(22) Filed: Jun. 9, 2010

(65) Prior Publication Data

US 2011/0093106 A1    Apr. 21, 2011

Related U.S. Application Data

(60) Provisional application No. 61/252,877, filed on Oct. 19, 2009.

(51) Int. Cl.
*G06F 19/00* (2011.01)
*B29C 45/00* (2006.01)
(52) U.S. Cl. .................. 700/98; 700/103; 700/200
(58) Field of Classification Search .............. 700/98, 700/103, 182, 200, 204
See application file for complete search history.

(56) References Cited

U.S. PATENT DOCUMENTS

| | | | |
|---|---|---|---|
| 5,812,402 A * | 9/1998 | Nishiyama et al. | 700/97 |
| 6,223,092 B1 | 4/2001 | Miyakawa et al. | |
| 6,597,355 B1 | 7/2003 | Kulkarni | |
| 6,760,038 B2 | 7/2004 | Venkataraman et al. | |
| 6,836,699 B2 | 12/2004 | Lukis et al. | |
| 7,042,451 B2 | 5/2006 | Venkataraman et al. | |
| 7,603,191 B2 | 10/2009 | Gross | |
| 2005/0120010 A1 | 6/2005 | Philpott et al. | |
| 2006/0173566 A1 | 8/2006 | Walls-Manning et al. | |
| 2008/0246188 A1 * | 10/2008 | Arai et al. | 264/328.12 |

* cited by examiner

*Primary Examiner* — Sean Shechtman
(74) *Attorney, Agent, or Firm* — Stites & Harbison PLLC; Jeffrey A. Haeberlin

(57) ABSTRACT

A method of automatic manufacturability evaluation of plastic models comprises generation of a likely pulling direction, recognition of common features on plastic parts, and then applying manufacturability rules The manufacturability rules can be specified and customized through user specified rule parameters and depend upon the geometric parameters of the recognized features. A system comprises a user interface for selection and customization of DFX (Design for 'X') rules for evaluation of a design. The system includes a user interface integrated with a CAD system for receiving the CAD data and displaying the results to the user. Geometry analysis engines are integrated into the system, for extracting the various features and corresponding parameters required as input to the manufacturability rules. The system further involves extensible interfaces for rules and analysis engines which allows users to write their own customized rules and engines and integrate these into the CAD based DFX evaluation system.

9 Claims, 30 Drawing Sheets

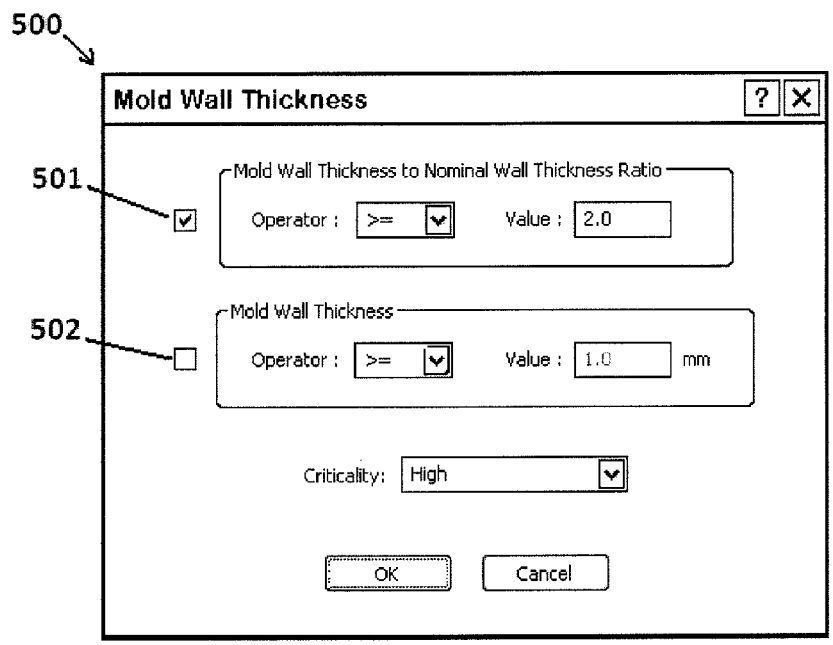

FIG. 6

```
600    601
  ↘     ↘
   - <Rule Name="Minimum Radius at Base of Boss" Status="0" LifeStatus="1"
       Summary="Ratio of radius at the base of boss to nominal wall thickness should be
  602    greater than or equal to 0.25." Module="DfmIMRulesValidator"————————604
         RuleModule="Injection Molding Rules" RuleModuleFileName="dfmimrulesu.dll"
  603___Severity="2" RuleCategory="Injection Molding">                           605
       - <Parameter Name="Boss Base Radius to Nominal Wall Thickness" Type="2054">
           <Operator>7</Operator>
           <ParameterType>1</ParameterType>
           <Value>0.250000</Value>
           <Remarks />
         </Parameter>
       - <Parameter Name="Minimum Radius" Type="2055">
           <Operator>7</Operator>
           <ParameterType>1</ParameterType>
           <Value>0.000000</Value>
           <Value>0.400000</Value>
           <Remarks />
         </Parameter>
     </Rule>
```

FIG. 7

FIG. 33
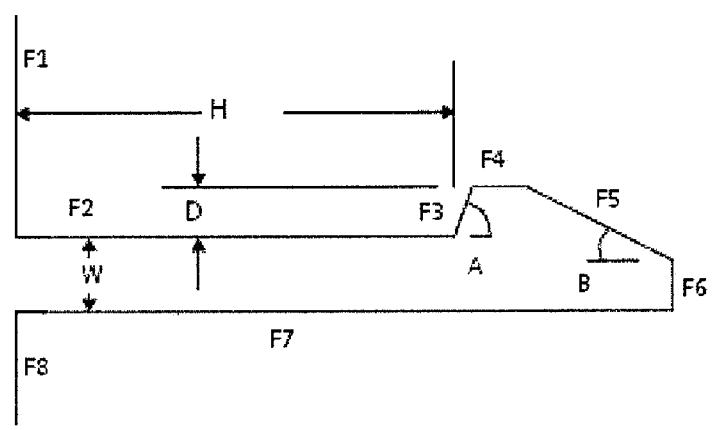
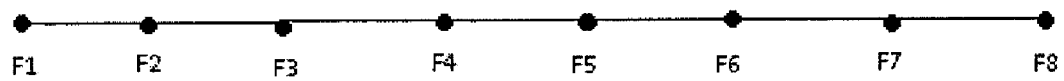
FIG. 34

MANUFACTURABILITY EVALUATION OF INJECTION MOLDED PLASTIC MODELS USING A CAD BASED DFX EVALUATION SYSTEM

CROSS-REFERENCE TO RELATED APPLICATIONS

This application claims the benefit of U.S. Provisional Application No. 61/252,877, filed Oct. 19, 2009, which is incorporated herein by reference.

FIELD OF THE INVENTION

The present invention relates generally to computer aided design for various domains, such as manufacturing, assembly, costing, sustainability, and, more particularly, to a method and system for automated manufacturability analysis of injection molded plastic models. This system applies to die-cast models as well.

BACKGROUND OF THE INVENTION

The following patents are incorporated herein by reference: U.S. Pat. No. 6,760,038, issued Jul. 6, 2004, entitled "METHOD FOR RECOGNIZING BLENDS IN SOLID MODELS"; U.S. Pat. No. 7,042,451, issued May 9, 2006, entitled "METHODS USING SPECIFIC ATTRIBUTES AND GRAPH GRAMMARS IN GRAPH-BASED TECHNIQUES FOR FEATURE RECOGNITION"; and U.S. Pat. No. 6,597,355, issued Jul. 22, 2003, entitled "AUTOMATIC RECOGNITION AND SUPPRESSION OF COMPLEX INTERACTING HOLES."

Traditionally, plastic part manufacturers receive Computer-Aided-Design ("CAD") models or drawings from their clients and this is followed by a series of iterations during which the designs are modified taking into account ease of manufacturing and the tools available with the manufacturer. Many plastic part manufacturers have published guidelines related to designs when followed would lead to parts which are easy, cost effective and amenable to rapid manufacturing. Certain vendors also allow designs to be uploaded on their website for providing quotes.

A problem faced by organizations world-wide is how to reduce the time to market of a product. One of the areas of improvement is to reduce the back-and-forth design to manufacturing iterations. These iterations frequently occur due to various reasons—design has certain features which lead to increased cost or the design has features which may require usage of non-standard tools. For example, if a designer applies non-standard corner radii on a protrusion in a plastic model, the manufacturing department may have to procure an appropriate tool to machine the corresponding depression feature in the mold.

Many organizations have established guidelines and checklists and have put a manual design review process in place to reduce such problems. However, the lack of proper automation tools for evaluating the designs based on manufacturability parameters right in the designer's CAD environment poses difficulties in adoption and enforcement of the design review process.

Similarly, organizations all over the world experience a phase where the experienced workforce gradually retires as new engineers enter the design department. In such cases, the organization faces a significant loss of knowledge wherein best practices gained and lessons learnt over many years are lost. New design engineers lacking in experience on the manufacturing side, often tend to ignore manufacturing considerations in their design. This leads to increased number of design iterations which impacts cost and time to market. There is a need to capture the best practices prevalent in an organization as rules in software so that any design can be validated against them consistently.

Research has shown that most of the costs associated with the life cycle of a product are committed during the design phase. The costs involved are not only related to manufacturing but include everything right up to the disposal of the product. In today's environment, along with "design for manufacturing" ("DFM"), "design for assembly" ("DFA"), and "design for cost," "design for maintainability" and "design for disposal" are equally important, the general term being Design for 'X', where X can be any of the above. Vendors have traditionally concentrated on addressing the "design for manufacturing" and/or "design for assembly" issues in software due to various reasons like demand and capability for automation. Even in the addressed domains, most approaches have been driven by the manufacturing process with no or partial automation.

In the mechanical CAD environment, most of the existing DFM/DFA solutions are based on calculating the costs associated with manufacturing and/or assembly of the product. These solutions are either based on activity roll up (activity based costing) or feature roll up (feature based costing). To arrive at a useful cost figure, these solutions require that the cost parameters like tool cost, labor rates and several others be customized according to local factors. These factors also vary based on manufacturing process. In parallel, small and large organizations world wide have been working with quick-win kind of DFM approaches which involve usage of global or organizational best practices or guidelines which are tried and tested and suited to the organizational methods of operation. It also involves design and manufacturing departments working together and, creating and following the best practices or guidelines.

Both approaches have their pros and cons. A cost based approach ensures a mathematical precision to decision making during design of parts. However, organizations share many costs across products; distributing these costs between the products may prove difficult in many cases. Not many of these solutions are integrated with CAD environments making these solutions difficult for a designer to practice and use on a continuous basis. Additionally, many design features may not affect cost directly but have an indirect impact in terms of quality of the product. This impact is not captured by many costing software.

A manual best-practice oriented DFM approach delivers knowledge and experience based wins but human errors during reviews present challenges. Another problem which manufacturers worldwide are trying to address is knowledge and best practice retention taking into account the ageing workforce and outsourcing of various parts of the manufacturing process.

SUMMARY OF THE INVENTION

In accordance with an embodiment of the invention, there is disclosed a method and system for automatically performing manufacturability analysis of injection molded plastic models. The method for evaluating ease of manufacturability for a three-dimensional injection molded plastic computer-aided-design (CAD) model consists of using different program modules to generate a likely pulling direction, identifying core, cavity and undercut regions on the CAD model, computing wall thickness parameters of the CAD model and wall thickness parameters of the corresponding mold, identifying various form features like ribs, bosses, holes, drafts, pins, snap-fits and using the features and parameters to apply manufacturability rules stored in a rule database. According to the invention, a likely pulling direction is identified as the most commonly occurring axis of the said boss features or a normal of the plane defined by the mid-plane normals of the said rib features. Classification of the faces into core, cavity and undercut regions is performed by firing rays along and opposite to the pulling direction and finding obstructions to these rays. Faces having obstructions only in negative pulling direction are core faces, while faces having obstructions only in pulling direction are cavity faces. Faces having obstructions in both directions are classified as undercut faces. According to the invention, wall thickness is computed by fitting tangential spheres in the triangulated model while mold wall thickness is computed by fitting tangential spheres external to the CAD model. Pins, snap-fit and hole features are recognized by using feature recognition algorithms and identified parameters are used to check manufacturability rules.

According to the invention, the manufacturability analysis of injection molded plastic models is handled using computer aided DFX evaluation system which comprises a program for receiving rule related inputs from the user, a rule file for inputs related to rules and a program for receiving the inputs of the CAD model, applying the rules and displaying the results. The invention also provides a framework of extensible interfaces for users to write their analysis engines and rules. It also provided a set of application program interfaces (APIs) for automated processing. The invention also discloses a method for DFX evaluation which consists getting manufacturability feature information from the CAD model, executing rules based on these features; and displaying the results to the user. The extensible and customizable system used for manufacturability evaluation of injection molded plastic models can also be used for performing any DFX (Design for "X") evaluation within a CAD system.

This system tries to address the limitations of both the cost based DFM systems and manual DFM approaches by providing an interface to the user for configuring the DFX rules. In addition, the user can also add new rules as and when required, depending on the design validation requirements. To generate input parameters required by the rules, users can integrate their own analysis engines. An analysis engine is a piece of software which analyses the CAD model and generates the requisite information for rule processing. For example, the generated information may be related to manufacturing features or thickness parameters or attribute information and so on. These functionalities can be easily implemented by extending the interfaces specified in this system. For basic and quick extensibility, the system provides a script based interface wherein the user can quickly write rules by interfacing with the default engines as well as newly written customized engines and/or CAD APIs in a seamless manner. The published interfaces for displaying the results of the DFX evaluation enable the user to display results of the customized/extended rules using customized or default engines in the same result interface in a seamless manner.

Further features and advantages of the present invention will be set forth in, or apparent from, the detailed description of preferred embodiments thereof which follows.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a screen shot of a sample user interface for rule configuration. This particular scenario provides the user interface elements to configure the parameters of a mold wall thickness rule.

FIG. 7 is a display of a human readable format of a rule file containing the selected rules and corresponding parameters.

FIG. 33 is a view of a cylindrical (annular) snap-fit region of a part.

FIG. 34 is a schematic topological graph of a cross-sectional shape of the snap-fit region of FIG. 32.

DETAIL DESCRIPTION OF EXEMPLARY EMBODIMENTS

Existing techniques for DFX evaluation are mainly manufacturing and assembly driven; are cost based and not easily extensible to address other DFX requirements or automate the DFM practices referred to by an organization. In an exemplary embodiment of the invention, a system automatically evaluates the manufacturability of injection molded plastic models.

Figure 1:
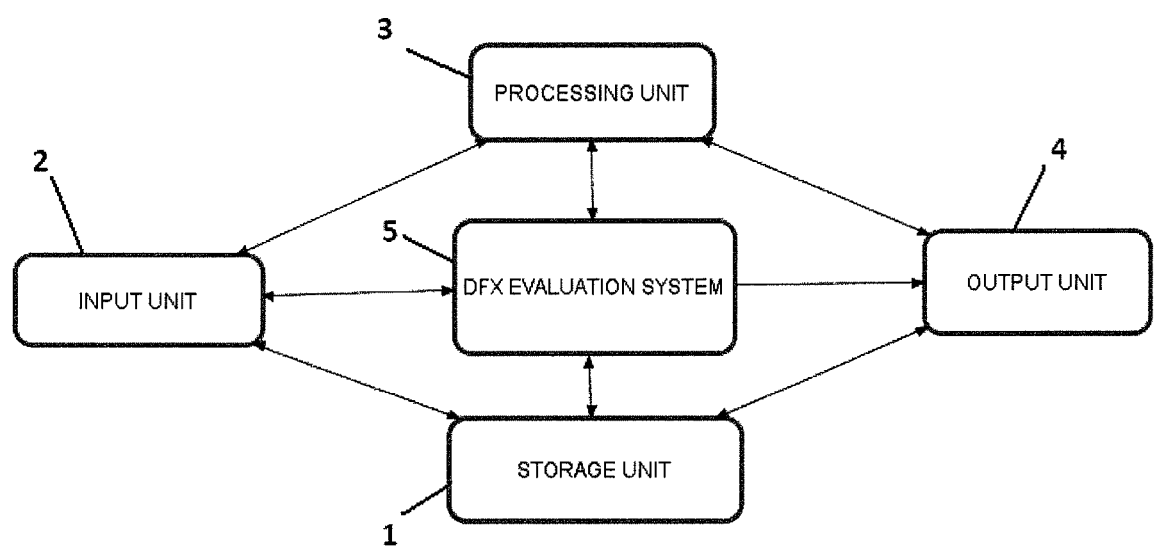
FIG. 1 is a block diagram of an exemplary system for manufacturability analysis of injection molded plastic computer-aided-design (CAD) models, according to the invention.

FIG. 1 is a block diagram of an exemplary system for manufacturability analysis of injection molded plastic CAD models, including: a DFX evaluation system 5, a data storage unit 1, a data input unit 2, a data processing unit 3, and a data output unit 4. The data storage unit 1 comprises a main memory and hard disk. Various program modules used to automatically recognize features and compute parameters are stored in the hard disk. The input unit 2 includes a keyboard and a pointing device. The output unit 4 comprises a computer display. The data processing unit 3 includes a CPU or a distributed processing framework.

Figure 2:
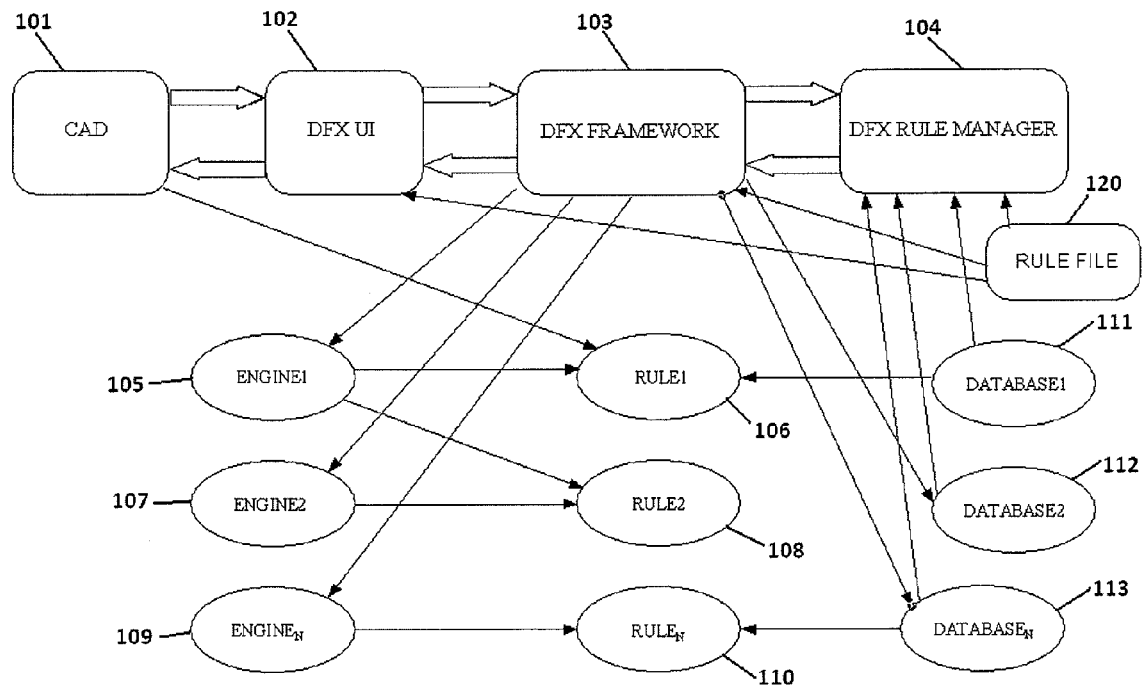
FIG. 2 is a block diagram of the extensible and customizable DFX evaluation system of FIG. 1.

FIG. 2 is a block diagram of the extensible and customizable DFX evaluation system 5. A DFX user interface ("UI") module 102 is a seamlessly integrated user interface available from within a CAD system 101, thus providing a designer with a quick and interactive DFX evaluation feedback during design. A DFX Framework module 103 forms a backbone of the DFX evaluation system 5 (FIG. 1), integrating components and specifying a communication mechanism between the DFX UI module 102, a plurality of exemplary analysis engines 105, 107, 109, a plurality of exemplary rule modules 106, 108, 110 and a plurality of exemplary database modules 111, 112, 113. The DFX Framework module 103 represents an architecture which enables ease of use, extensibility and customization. A DFX Rule Manager module 104 is a small standalone application for customization of rule parameters, the output of which is a rule file 120 which serves as an input to the DFX UI module 102. There may be a finite number of analysis engines which may be applied to extract data (needed for rule processing) from the CAD model. Similarly, there may be a finite number of rule modules for rule processing and database modules for archival and retrieval of relational data.

Engine1 105 is an exemplary analysis engine used by the DFX evaluation system 5 to extract data for analysis from a CAD model, for example, volumetric features (pockets, slots, holes, ribs, bosses) and corresponding parameters (depth, width, height, shape). Similarly, Engine2 107 is another exemplary analysis engine for extraction of thickness related features (nominal wall, mold wall) and corresponding parameters (thickness, clearance at various locations). EngineN may be applied to extract other features, namely small faces and small edges. The engines to be actually utilized will depend upon the kind of DFX evaluation being undertaken. Database1 111 is an exemplary database from the plurality of databases 111, 112, 113 used by the DFX evaluation system 5 to extract tabular and relational data. Database1 111 may, for example, contain various materials and allowable parameters regarding to specific machining processes (for example, maximum hole depth to diameter ratio for a given material). Database1 112 may contain machine and tool parameters. Similarly DatabaseN 113 may contain any other tabular data, for example, allowable nominal wall thickness for given materials or maximum bend radius based on materials. The Rule1 module 106 is an exemplary rule module specified for DFX evaluation. The Rule1 module 106, for example, may consist of one rule which utilizes data (number of holes in the CAD model) and parameters (hole depth and diameter) provided by Engine1 105 and predefined tabulated values (maximum hole depth to diameter ratio for a given material) from Database1 111 to determine whether there are instances in the CAD model which violate a design rule/guideline—Maximum depth to diameter ratio of a hole should be less than a predefined value. The Rule1 module 106 may also utilize the CAD system 101 to extract material information regarding the CAD model. Similarly, the rule implemented in Rule2 module 108 may utilize the output of Engine1 105 as well as Engine2 107 for verifying another design guideline—Ratio of rib thickness to nominal wall thickness should be less than a predefined value.

The DFX Framework module 103 specifies various interfaces which can be extended by users to write their own analysis engines and customized rules. The DFX Framework module 103 also comprises the rule engine which processes a rule file 120 for determining the rule modules 106 108, 110 to be executed and their dependencies and, hence, the order of execution. The DFX Framework module 103 also determines the engines 105, 107, 109 to be executed depending on the rule requirements and performs the execution.

Figure 3:
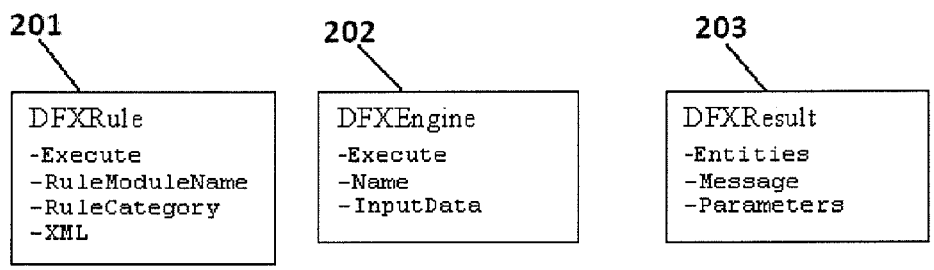
FIG. 3 is a block diagram of interfaces published by a DFX Framework of FIG. 2, which can be extended and customized as per requirements.

FIG. 3 is a block diagram of interfaces published by the DFX Framework 103 which can be extended and customized. Interface DFXRule 201 prescribes the methods for implementation by every rule. Method Execute is invoked by the framework when a particular rule is to be executed. Properties RuleModuleName and RuleCategory return the name and category (for example, milling, turning, injection molding, and sheetmetal) of the rule. Interface DFXEngine 202 prescribes the methods to be implemented by every analysis engine. Method Execute is invoked by the framework for executing the analysis engine. Property Name returns the name of the analysis engine and Method InputData allows for providing various inputs required for executing the analysis engine (CAD model, settings, options). Interface DFXResult 203 prescribes the methods to be implemented by every result of every rule. Methods Message and Parameters are invoked by the framework for getting the message and parameters to be displayed when a result instance is selected. Methods Entities is used to get the entities to be highlighted when the result instance is selected.

Figure 4:
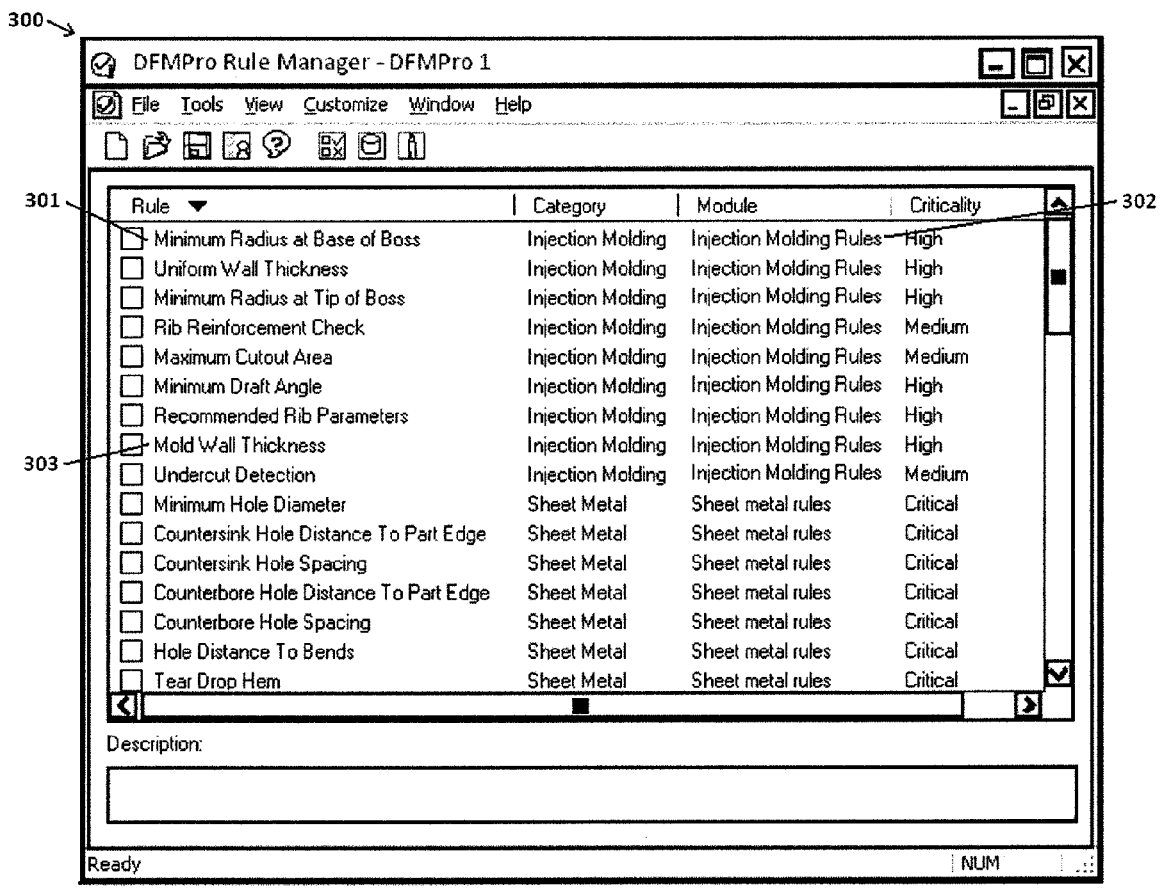
FIG. 4 is a screen shot of an exemplary user interface of the DFX Rule Manager of FIG. 2.

FIG. 4 is a screen shot of an exemplary user interface screen 300 of the DFX Rule Manager module 104 (FIG. 2). The exemplary user interface screen 300 allows users to register rules with the system, configure rule parameters and save selected rule sets in the rule file 120 (FIG. 2).

Referring now to FIG. 2, the rule file can then be input to the DFX evaluation system 5 using the DFX UI module 102 for execution in the CAD system 101.

Figure 5:
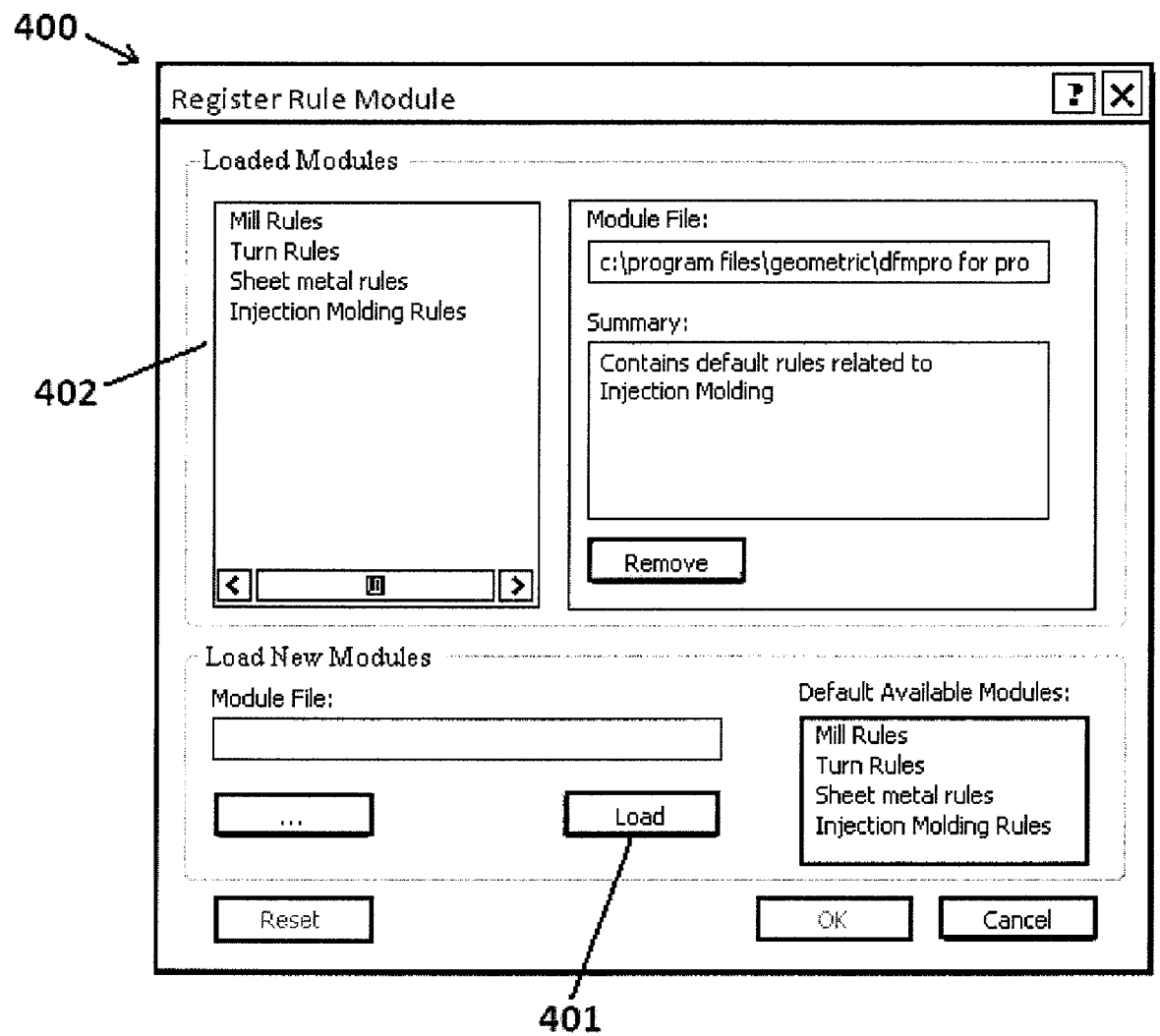
FIG. 5 is a screen shot of an exemplary user interface for registering a rule module with the system.

FIG. 5 is a screen shot of another exemplary user interface screen 400 of the DFX Rule Manager module 104 (FIG. 2), for registering analysis engines and rule modules written using the DFX framework module 103 (FIG. 2). This is enabled through selection of path of rule module to be registered and clicking Load button 401. Loading or registering the rule module requires extraction of rules implemented by the rule module and parameters supported by each rule using the interfaces prescribed by the DFX framework module 103 (FIG. 2). If any rule module being registered does not implement the interfaces as prescribed, the load procedure will fail and an error message will be displayed. Once a rule module is registered, it is displayed in list of loaded modules 402 (FIG. 5) and the rules are listed in the exemplary user interface screen 300 (FIG. 4) of the DFX Rule Manager module 104 (FIG. 2).

For example, a "Minimum Radius at Base of Boss" rule 301 is listed as a part of an Injection Molding Rules module 302. Each rule is configured by double clicking on the row listing the rule as shown in FIG. 4.

For example, FIG. 6 is a screen shot of another exemplary user interface screen 500 of the DFX Rule Manager module 104, for configuring a "Mold Wall thickness" rule 303 (FIG. 4). In this case, the system allows for the rule to be defined in terms of minimum allowable value of mold wall thickness ratio with part wall thickness using check box 501 or in terms of minimum allowable mold wall thickness as an absolute value using check box 502. In both these cases, appropriate values can be set in corresponding text boxes.

Returning to FIG. 4, the system allows for selection of rules to be executed through a checkbox to the left of every row listing a rule and then saving the selection as the "rule file".

Referring now to FIG. 2, all rules registered with the DFX Rule Manager module 104 are available for execution. However, only the user-selected rules along with the corresponding set of parameters are saved to the rule file. Only those selected rules are executed when the rule file is input using the DFX UI module 102. The rule file 120 is stored in a location selected by the user in a human readable format.

FIG. 7 is an exemplary display 600 of a portion of a rule file containing information of an exemplary rule stored in human readable format. Rule information consists of descriptive information of the rule including a name description 601 and a summary description 602. In addition, the rule module (for example, 106, 108, 110 (FIG. 2)) responsible for providing the implementation of the rule is also stored and referenced (for example, DFMIMRulesValidator, 604 and dfmimrulesu.dll, 605). Every rule consists of two components—a rule validator and a rule definition. The validation components of multiple rules may be combined in a single rule validator module while the definition component of multiple rules may be combined in a single rule definition module. The rule definition component provides functions for storing and accessing data regarding the rule, whereas the rule validator component contains the implementation of the rule validation and functions to execute the rule validation routines. These functions adhere to prescribed interfaces required by the DFX framework module 103 (FIG. 2). Additionally, rule parameters are also stored in a structure understood by the rule module which is responsible for extracting the information from the human readable format and storing the rule in memory for machine execution. Criticality (or Severity) of a rule determines the importance of the rule which helps the user prioritize the design correction actions. A rule category description 603 determines whether the rule is executed, or not, based on a selected manufacturing process.

Figure 8:
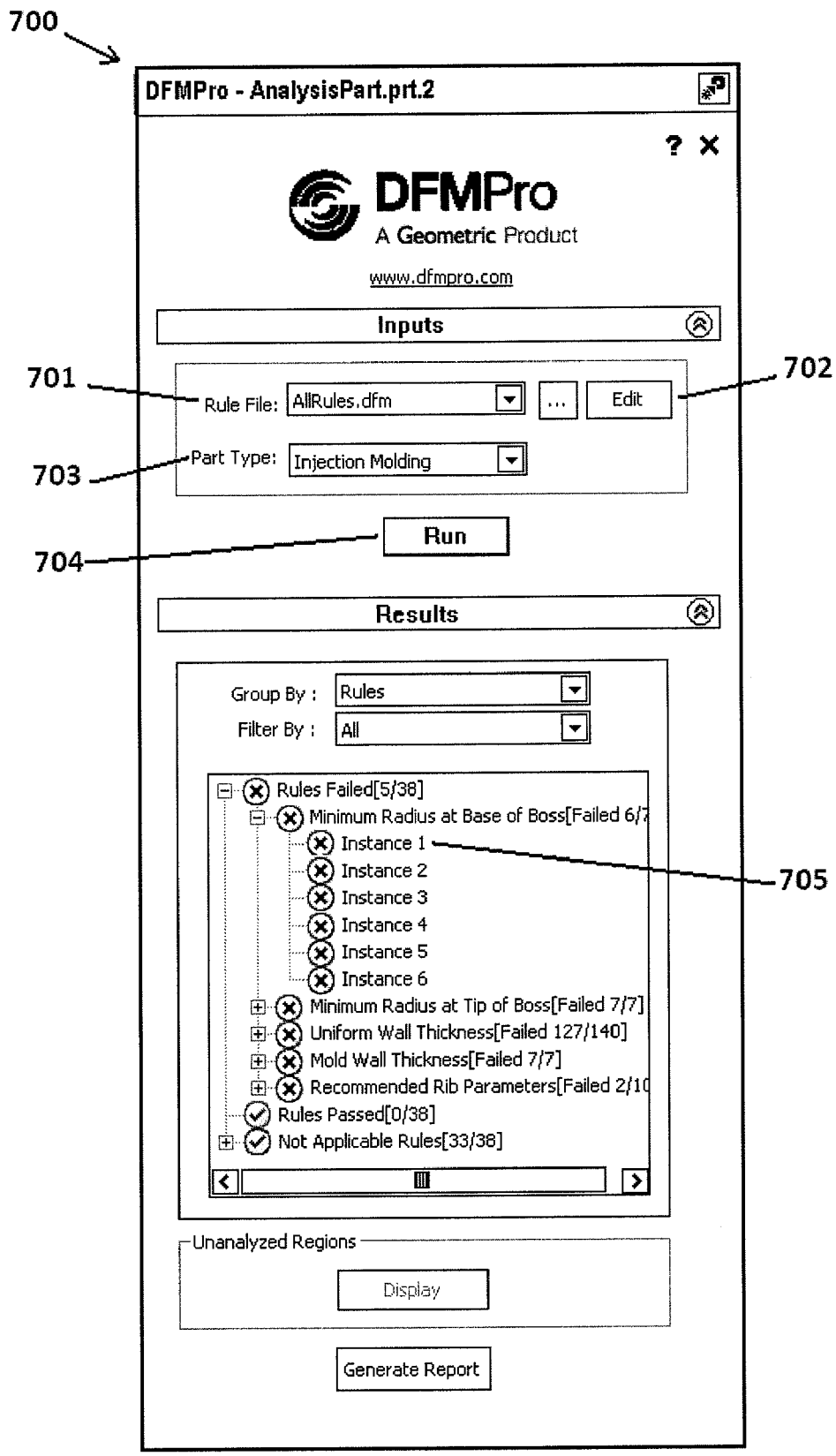
FIG. 8 is a screen shot of an exemplary user interface integrated with a CAD system allowing the user the flexibility of validating various DFX rules from within the design environment.

FIG. 8 is a screen shot of an exemplary user interface screen 700 of the DFX UI 102 (FIG. 2), for selecting the rule file for execution and for displaying the results to the user. In response to receiving an input from the user via a "Rule File" input 701, the DFX framework module 103 (FIG. 2) utilizes the selected rule file for execution. The rule file comprises the set of rules along with the associated parameters relevant for this particular execution. In response to receiving an input from the user via an Edit button 702, DFX framework module 103 (FIG. 2) launches the DFX Rule Manager having an exemplary user interface screen 300, as shown in FIG. 4 for editing the rule file. In response to user selection of an appropriate part type 703 and clicking a Run button 704, the DFX Framework module 103 (FIG. 2) executes a sequence of steps and computes the rule validation results. The results are displayed to the user allowing the user to identify feature instances which do not match the criteria specified in the rule. For example, Instance 1 705 is an instance which fails for the rule "Minimum Radius at Base of Boss". On clicking the instance, CAD system 101 (FIG. 2) highlights the feature entities in a graphics area of the CAD system 101 and a corresponding design feature (if present) is highlighted in the design feature list of the CAD system 101.

The first step executed by the DFX Framework module 103 (FIG. 2) is parsing the rule file and determining the rules relevant for the current execution. This includes checking if the category of the rule matches the selected part type (manufacturing process). For each rule, the rule validator module is located using the rule module file name (for example, 604 and 605 in FIG. 7) and loaded in memory. The rule validator module determines the data it needs to validate the rules and thereby the analysis engines required to generate that data, which are also located and loaded in memory. Subsequently, each rule is executed and checked for failure or pass criterion based on the preset rule parameters. For example, consider rule related to validation of "Minimum Radius at Base of Boss". The rule validator module determines that it needs the blend recognition engine to extract fillet parameters associated with the boss. The part is processed using the blend recognition engine and appropriate parameters (for example, the fillet radii) are extracted. The rule validator module then checks the fillet radii against the minimum acceptable value specified in the rule parameters. If this condition fails, this particular instance is listed as a failure instance against this rule. The framework APIs can then be invoked to set the entities to be displayed to the user when this instance (for example, Instance 705) is selected in the results area. See FIG. 8.

The system also provides application programming interfaces (APIs) such that the DFX evaluation system 5 (FIG. 1) can be invoked in a non-interactive mode with a CAD file and the rule file as inputs. The DFX evaluation system 5 completes the feature recognition and rule processing steps and, on user input, generates report of the execution in either a human readable format or optionally a 3D report format using 3D publishing capabilities provided by CAD vendors.

Figure 9:
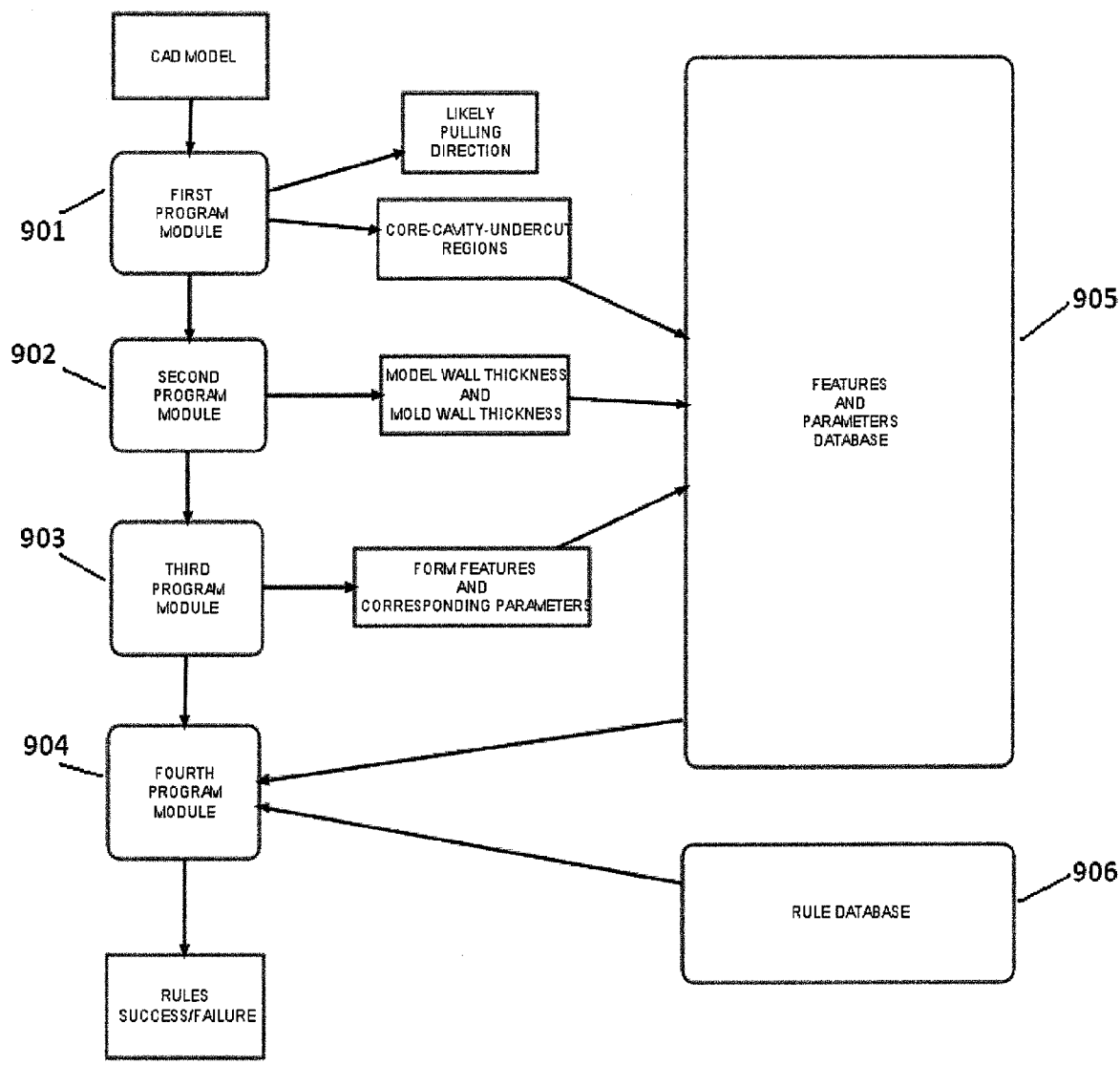
FIG. 9 is a functional block diagram of components of an exemplary system for automatically identifying features and corresponding parameters on the CAD model and evaluating the manufacturability related rules for success/failure.

FIG. 9 is a functional block diagram of various program modules (901, 902, and 903) that are utilized to determine likely pulling direction, to identify core, cavity and undercut regions, to compute model and mold wall thickness and to recognize various form features and corresponding parameters. The features and parameters are stored in a "features and parameters" database 905. Another program module 904 makes use of these feature parameters and the manufacturability rules stored in a rule database 906 to determine the ease of manufacturability of the input CAD model. To determine the likely pulling direction, the method uses a heuristic that in parts containing bosses and ribs, the pulling direction would commonly be along the axes of the boss features and would lie in the mid-planes of the ribs. In case of self standing rectangular or trapezoidal ribs, it is even likely to be same as the normal of the top planar face.

For identifying ribs, a feature recognition algorithm identifies a pair of edges belonging to a same face in a model which are offset by a distance not exceeding a preset value. Each of such edges must be convex with an angle between the neighboring faces nearing ninety degrees. Fillets are ignored while determining neighbors.

Figure 10:
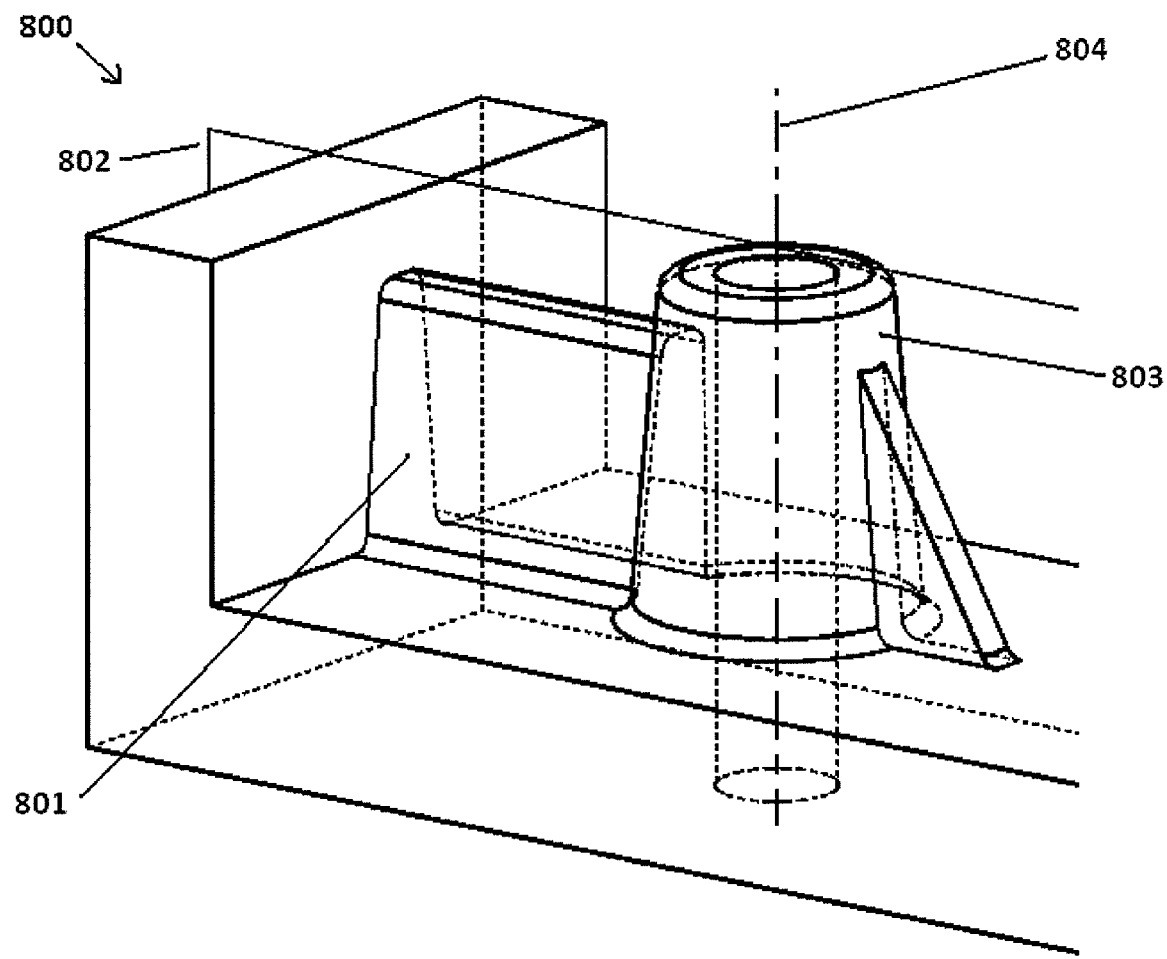
FIG. 10 is a partial perspective view of a rib and a boss.

FIG. 10 is a view of a CAD model 800, wherein a midplane 802 of a rib is identified as a plane equidistant from end faces 801 of the rib. A cylindrical/conical protrusion 803 on the model is identified as a boss. An axis 804 of the cylindrical/conical protrusion 803 lying in the rib mid-plane 802 is a likely pulling direction. Such likely pulling directions are identified for all bosses and ribs. The most commonly occurring axis among these likely pulling directions is selected as a candidate pulling direction and displayed to the user for confirmation. A second mode is also provided where user confirmation is not required.

Figure 11:
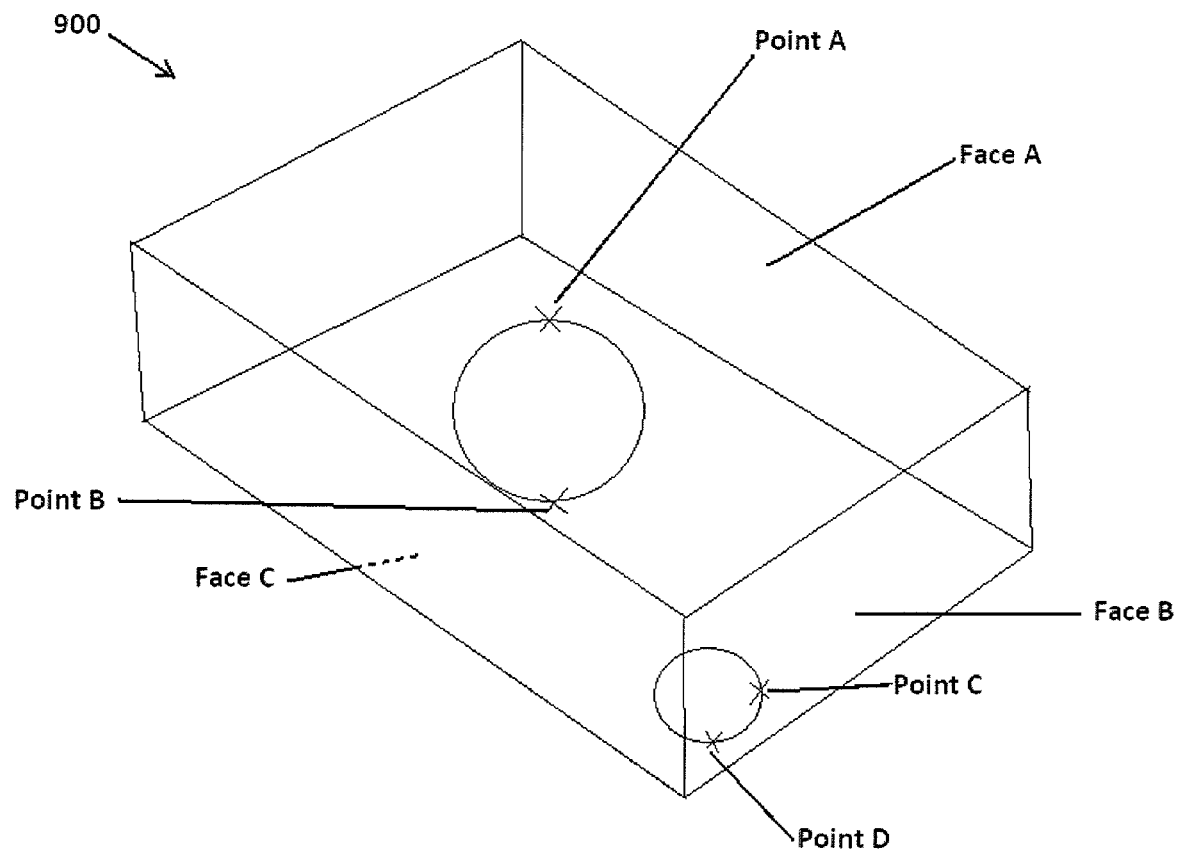
FIG. 11 is a schematic view of a CAD model including spheres for use with a sphere fitting method for wall thickness calculation.

FIG. 11 is a view of another CAD model 900. Thin and thick areas in the model 900 are computed using a sphere method. Corner areas are avoided by ignoring neighboring faces. Face A is a top face, Face B is a side face and Face C is a bottom face. For certain algorithms described herein, which work on triangulated data of CAD models, the triangulated data is obtained by utilizing APIs provided by the CAD system 101 (FIG. 2). Thickness is computed at point A (center of a triangle), and hit point is "Point B" which is on (bottom) Face C. A diameter of a sphere represents the thickness of the model at point A. At another point in the model 900, a thickness at Point D on "Face C" is a diameter of a sphere constrained by (side) Face B at point C. Such conditions are avoided for computation of thin regions.

Figure 12:
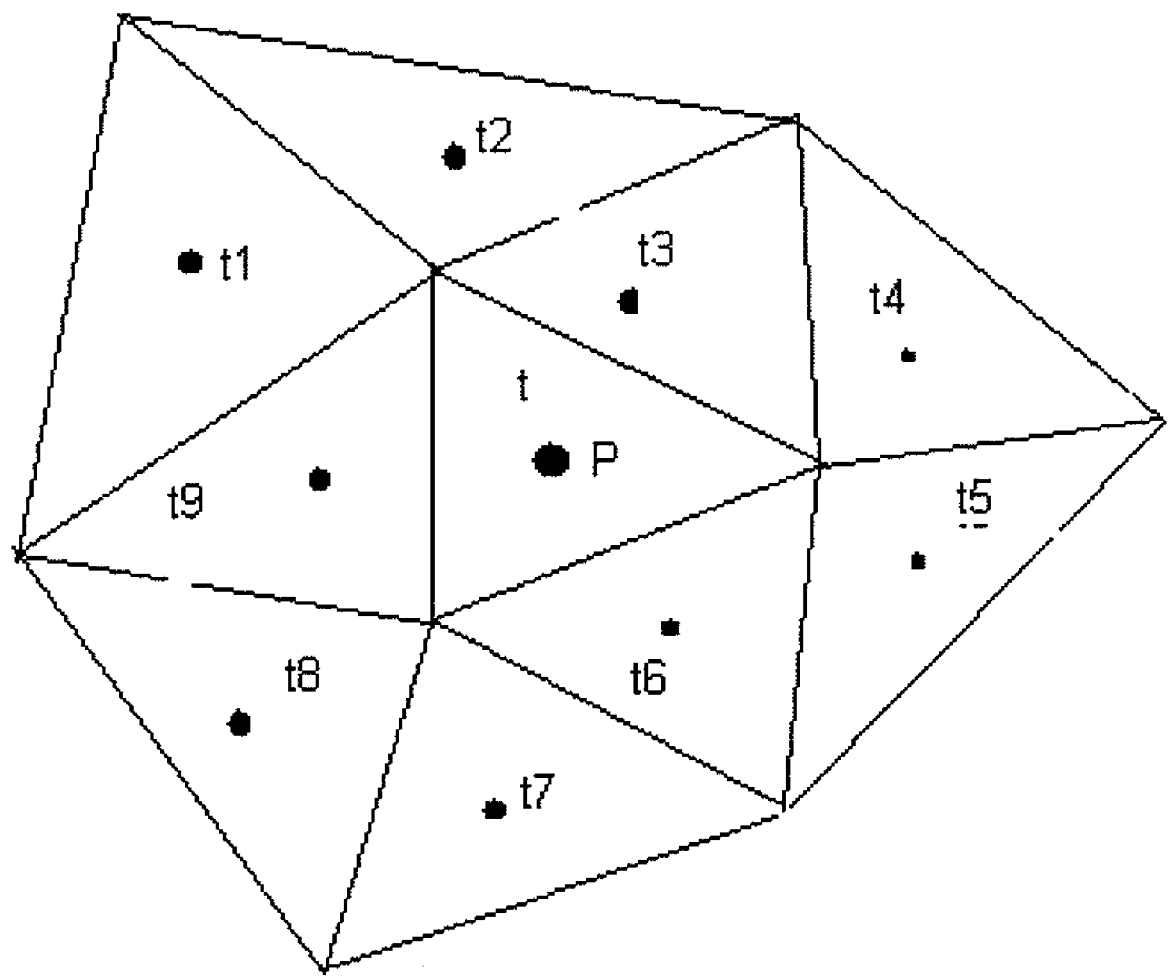
FIG. 12 is a schematic view of a triangulated region used in a method of computing a variation in thickness at a given point.

FIG. 12 is a pictorial representation of an exemplary triangulated region. For computing a variation in thickness at point P, all triangles neighboring the point P are traversed; the maximum difference between the thickness at point P and the thickness at the center of all triangles surrounding point P is computed. The maximum difference is the deviation of thickness at point P.

$$\text{Deviation} = \text{Max}\{t_i - t\}_P \quad (1)$$

Where $t_i$ is the thickness at the surrounding triangles at point P and t is the thickness at point P.

To identify core, cavity and undercut regions, initially vertical and non-vertical faces are determined. Faces are termed as vertical if they satisfy the following criteria: face normals at sufficiently sampled points lie in a single plane whose normal is perpendicular to the pull direction.

Figure 13:
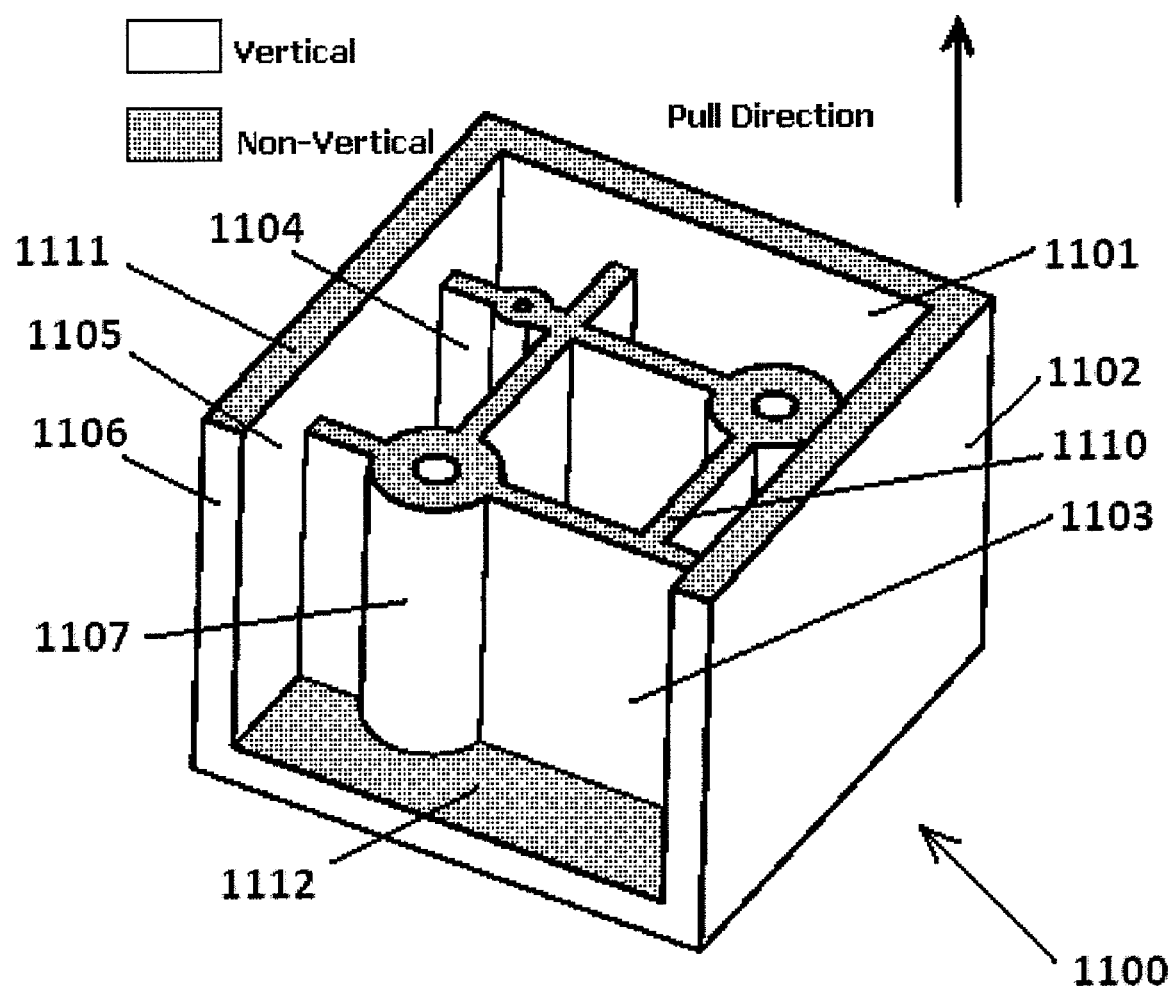
FIG. 13 is a schematic view of a CAD model having vertical and non-vertical faces.

FIG. 13 is a view of yet another CAD model 1100 having a number of vertical faces including faces 1101, 1102, 1103, 1104, 1105, 1106 and a number of non-vertical faces including faces 1110, 1111, 1112.

Figure 16:
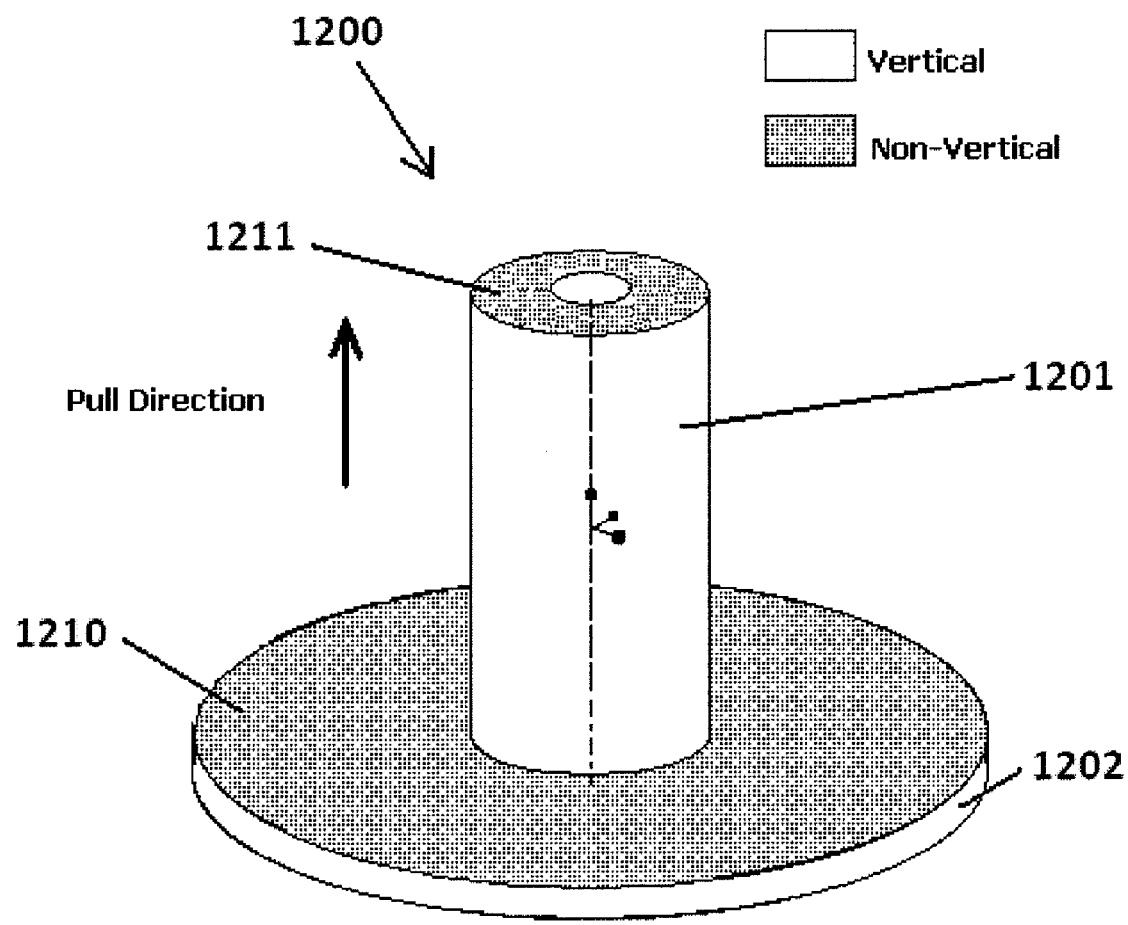
FIG. 16 is a view of another CAD model having vertical and non-vertical faces.

FIG. 16 is a view of yet another CAD model 1200 having a number of vertical faces including faces 1201, 1202 and non-vertical faces including faces 1210 and 1211.

Figure 14:
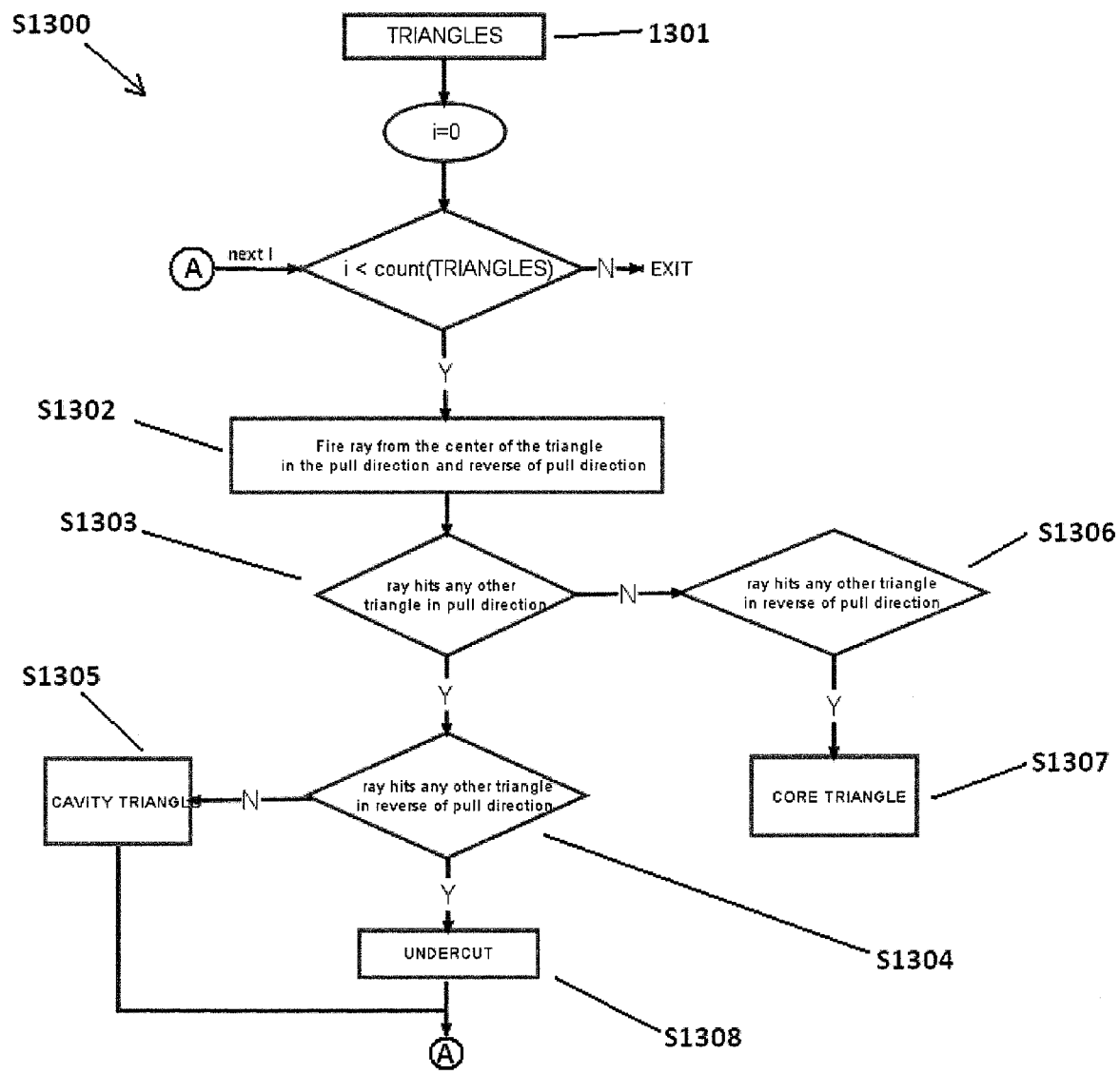
FIG. 14 is a flow chart of a method for deciding whether a triangle belong to a core, a cavity, or an undercut region.

FIG. 14 is a flow chart of an exemplary method S1300 to classify the non-vertical faces of a CAD model into core, cavity and undercut regions. Triangles 1301 of non-vertical faces are input to the classification process. For each triangle, a first step S1302 is firing a ray from the center of the triangle in the pull direction and in reverse of the pull direction. If the ray hits any other triangle in pull direction only (i.e., an affirmative result of step S1303, determining if the ray hits any other triangle in the pull direction, and a negative result of step S1304, determining if the ray hits any other triangle in reverse of the pull direction), then another step S1305 is to classify the source triangle as cavity triangle. If the ray hits any other triangle in reverse of pull direction only (i.e., a negative result of step S1303, determining if the ray hits any other triangle in the pull direction, and an affirmative result of step S1306, determining if the ray hits any other triangle in reverse of the pull direction), then another step S1307 is to classify the source triangle as a core triangle. If the ray hits any other triangle in both the directions (an affirmative result of step S1303, determining if the ray hits any other triangle in the pull direction, and an affirmative result of step S1304, determining if the ray hits any other triangle in reverse of the pull direction), then another step S1308 is to classify source triangle as undercut.

Figure 15:
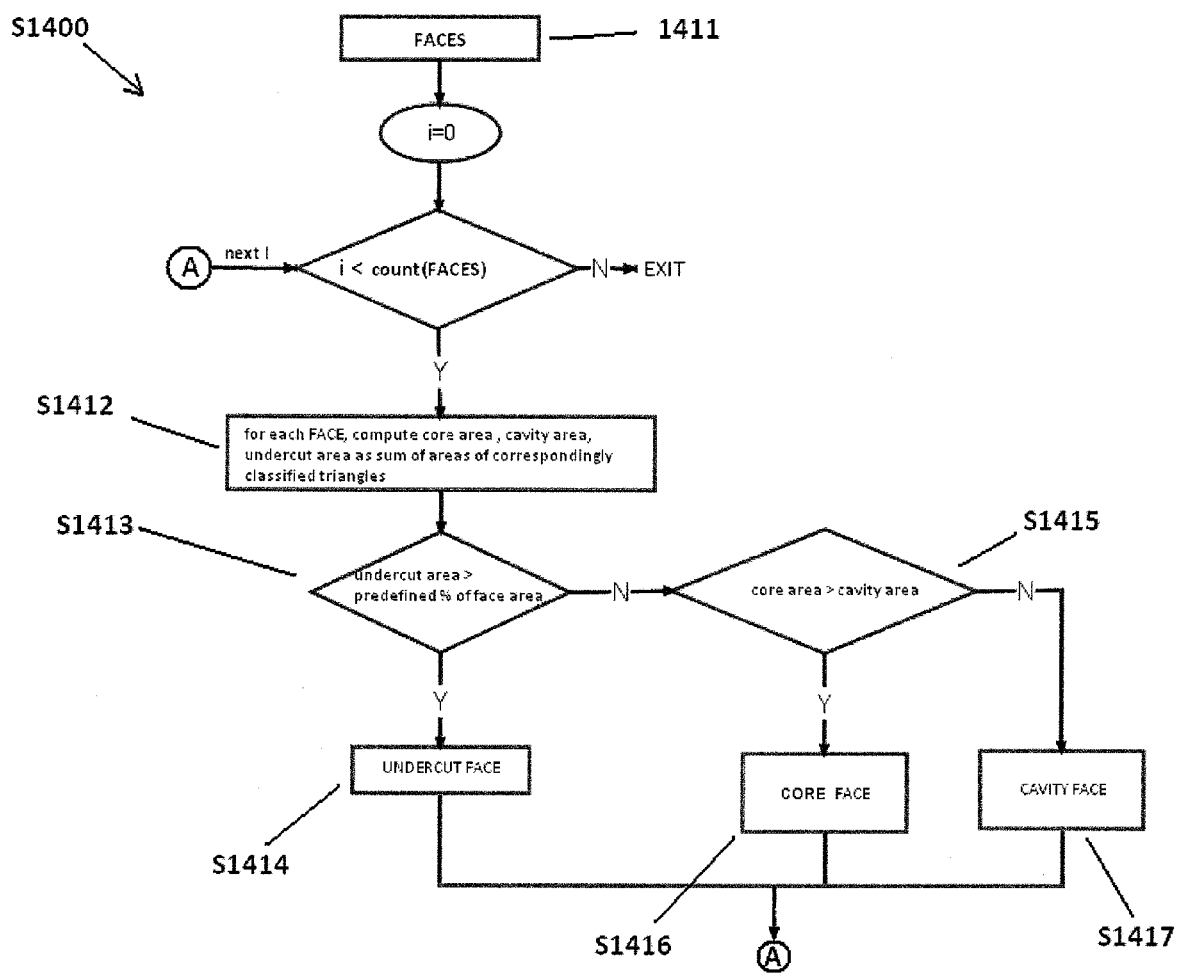
FIG. 15 is a flow chart of a method for classification of individual faces into core, cavity, and undercut faces.

The core area, cavity area and undercut area for each face are computed as a sum of areas of the correspondingly classified triangles. FIG. 15 is a flowchart of a method for classification of individual faces into core, cavity and undercut faces. Faces 1411 are input to the classification process. Step S1412 is computing core, cavity and undercut area for each face as sum of areas of corresponding face triangles with those classifications. Step S1413 checks if the percentage of undercut area for a face is greater than a user defined threshold limit, for example 1-5% which is a preset value based on material properties and geometry of the model, If the result is affirmative, Step S1414 is executed and the face is marked as an undercut face. If step S1413 provides a negative result, step S1415 is executed to check whether core area is greater than cavity area. If the result is affirmative, step S1416 marks the face as a core face; else the face is classified as a cavity face through step S1417.

Figure 17:
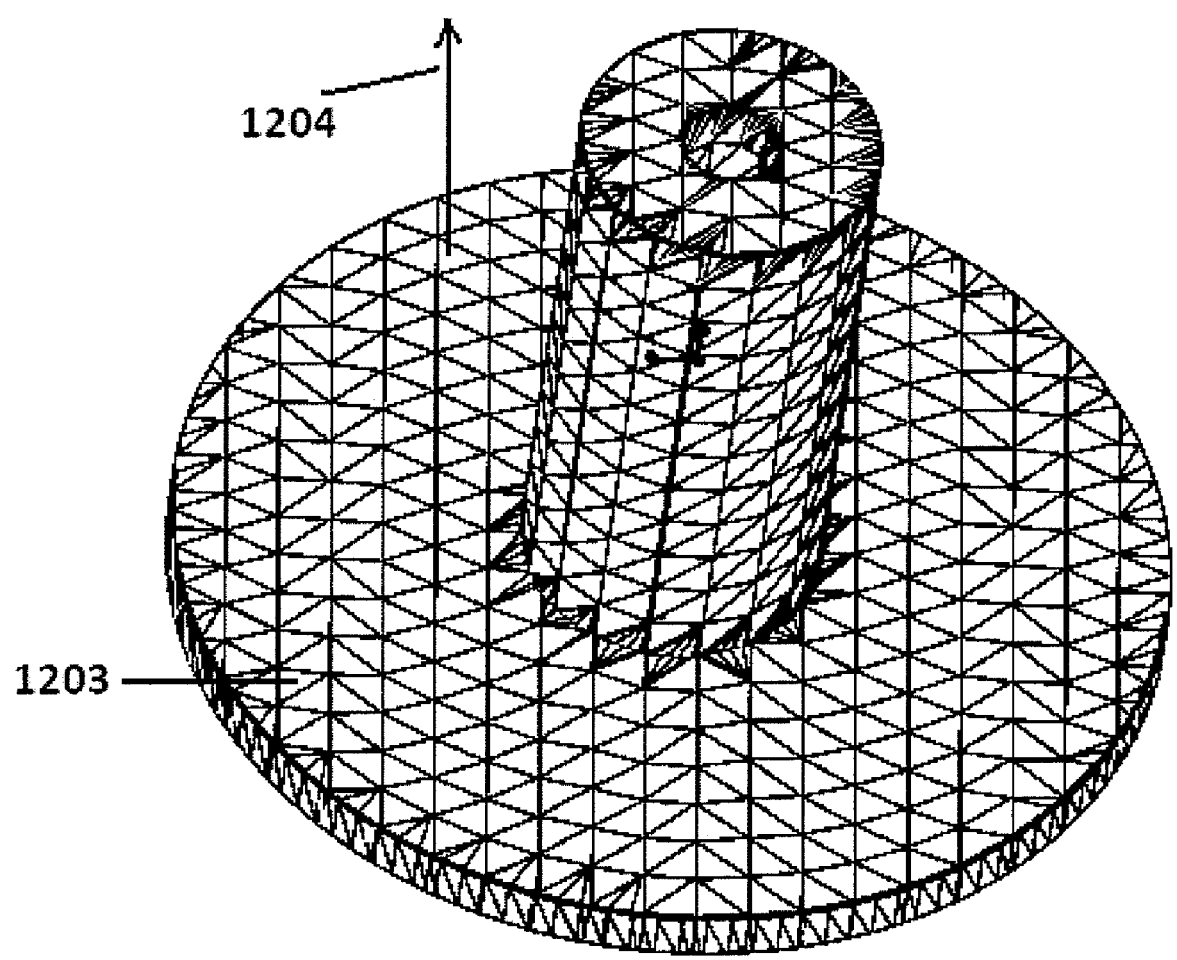
FIG. 17 is a view of a CAD model having a face wherein no trial results in a hit triangle along a pull direction.

FIG. 17 shows a planar face 1203 wherein no triangle results in a hit triangle along a pull direction 1204. For the same face, all triangles result in a hit triangle along the reverse of pull direction. Hence this face is classified as a core face.

Figure 18:
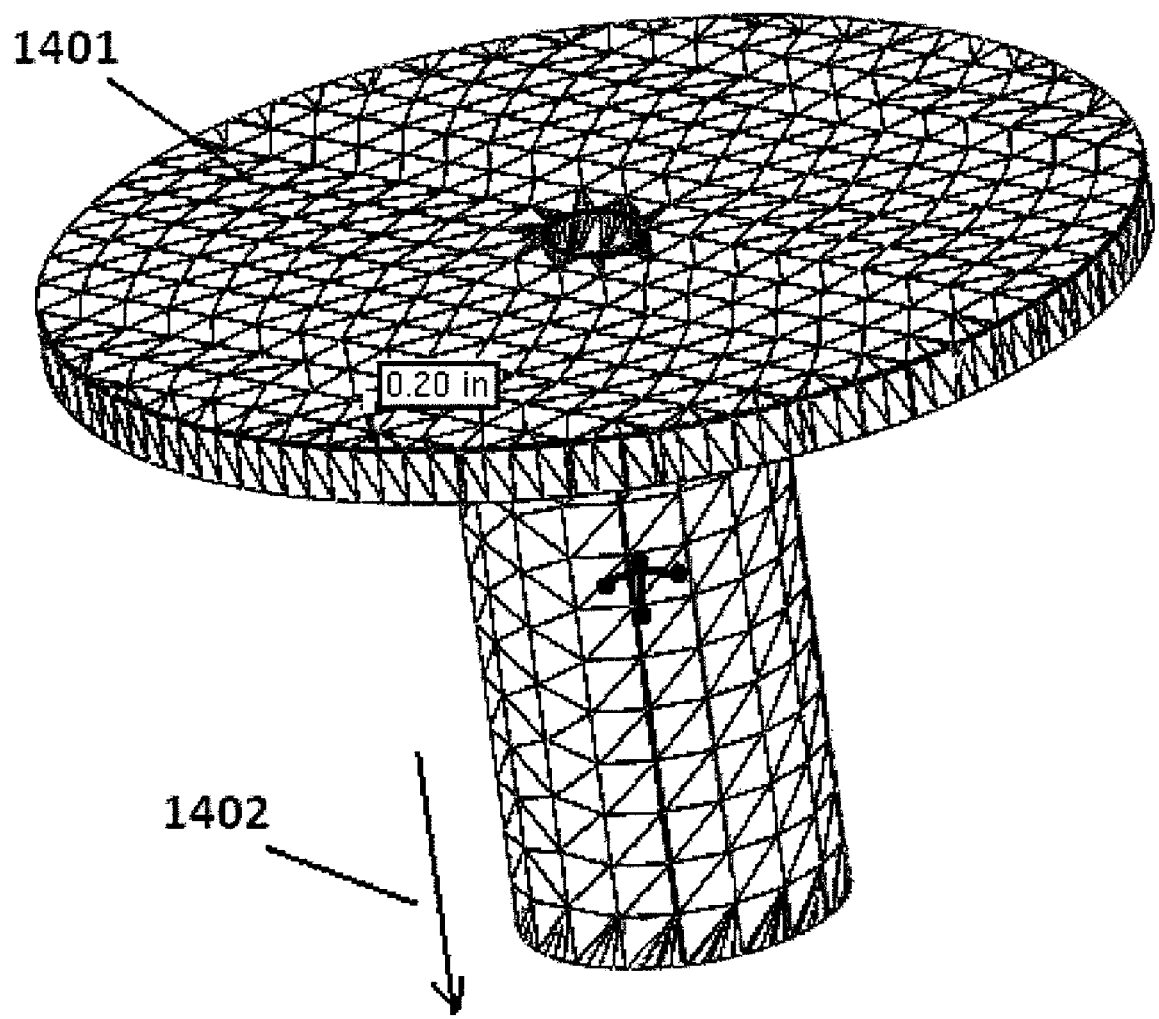
FIG. 18 is a view of a CAD model having a face wherein its triangles result in a hit along a pull direction, but do not hit any triangle in a direction opposite to the pulling direction.

FIG. 18 shows a cavity face 1401 which is classified so because all of its triangles result in a hit triangle along the pull direction 1402 but do not hit any triangle in the reverse direction.

Figure 19:
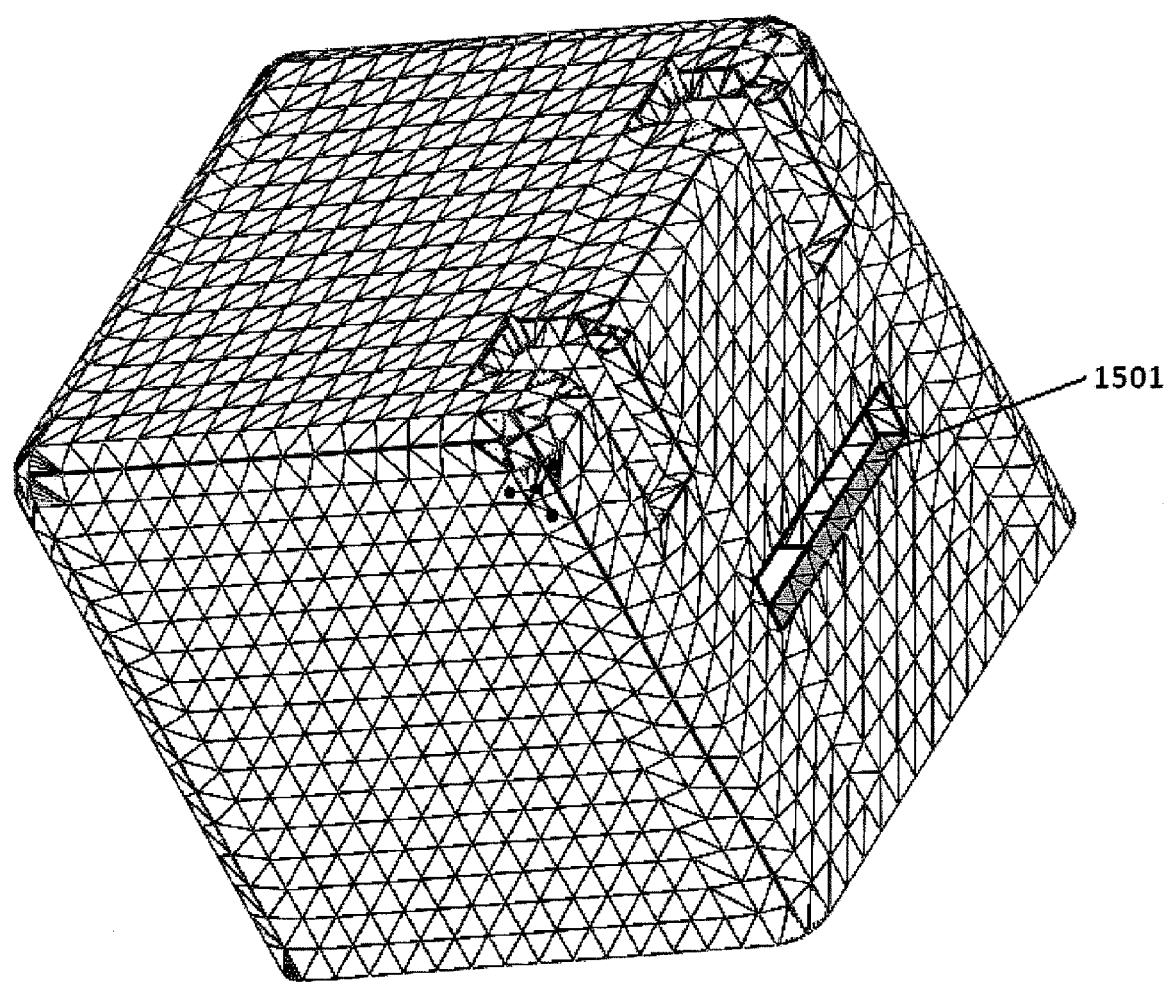
FIG. 19 and FIG. 20 are view of CAD models having undercut regions.

An undercut region 1501 (FIG. 19) consists of adjoining sets of faces wherein the triangles of the corresponding faces result in hit triangles in both directions.

Figure 20:
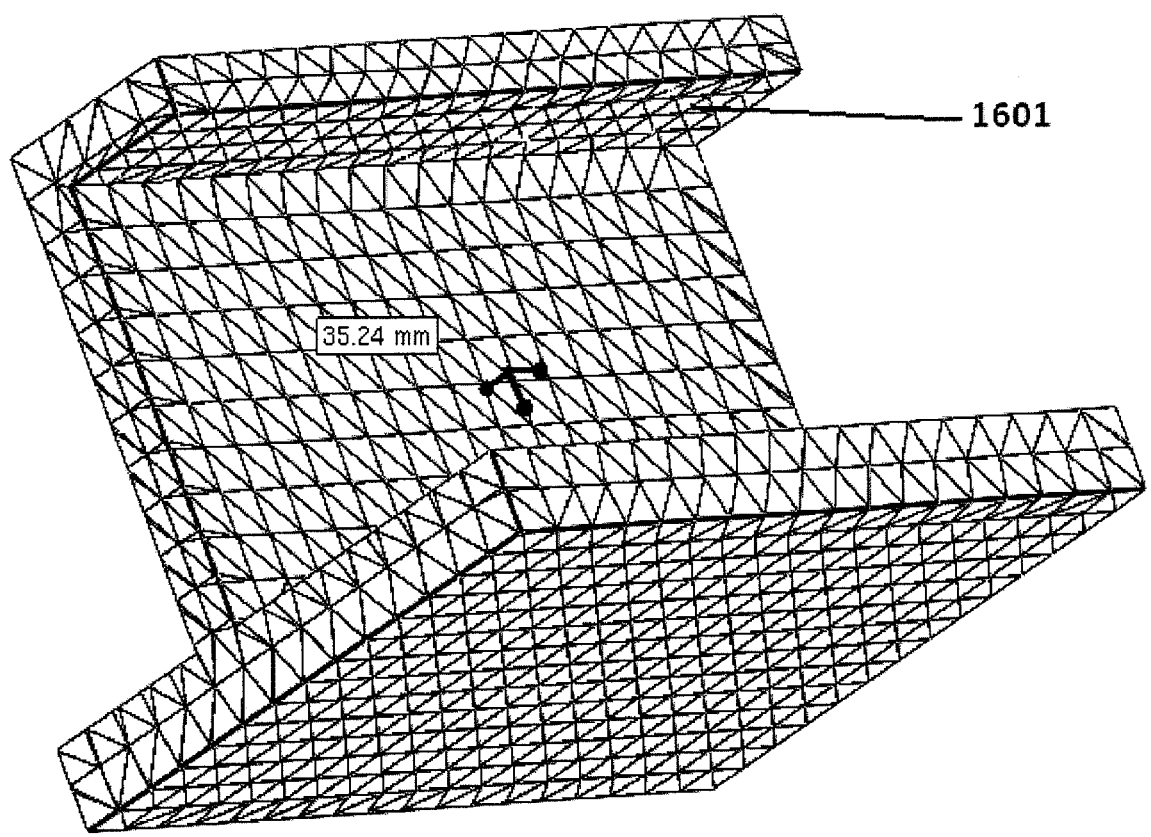

FIG. 20 also shows an undercut region 1601 wherein the triangles of the corresponding faces result in hit triangles in both directions.

A vertical face completely surrounded by core faces is marked as a core face. If a vertical face is completely surrounded by cavity faces, it is marked as a cavity face. Other vertical faces are marked as ambiguous faces.

Figure 21:
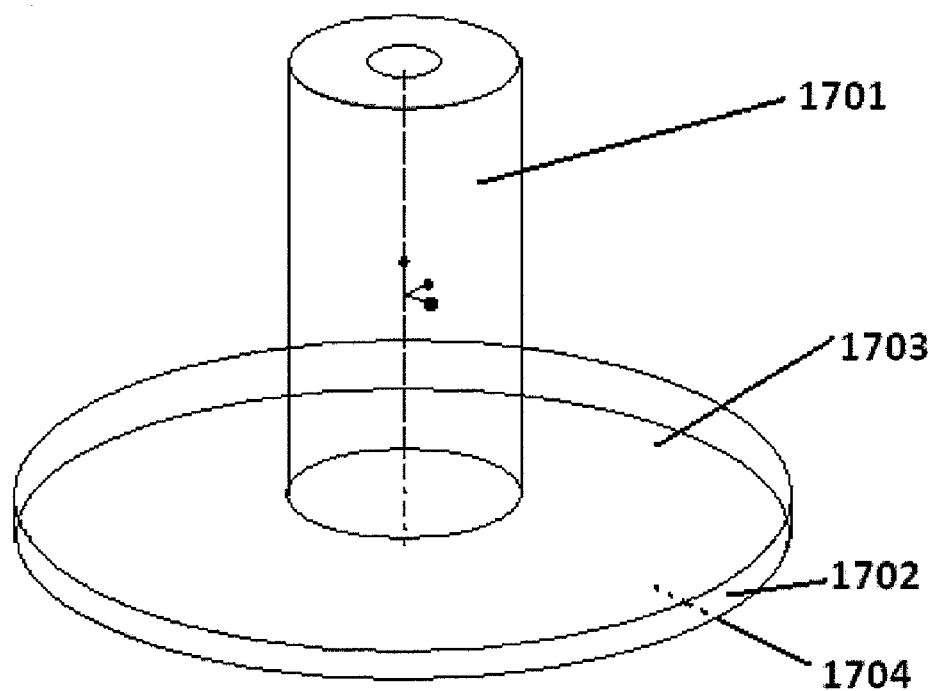
FIG. 21 is a view of a CAD model having an ambiguous face as a core face depending on surrounding faces.

FIG. 21 shows a cylindrical boss face 1701 classified as a core face because all the neighboring faces are already classified as core faces. Vertical cylindrical face 1702 is classified as an ambiguous face since the neighboring faces are both core and cavity (top neighbouring face 1703 belongs to core region while bottom neighbouring face 1704 belongs to cavity region).

Figure 22:
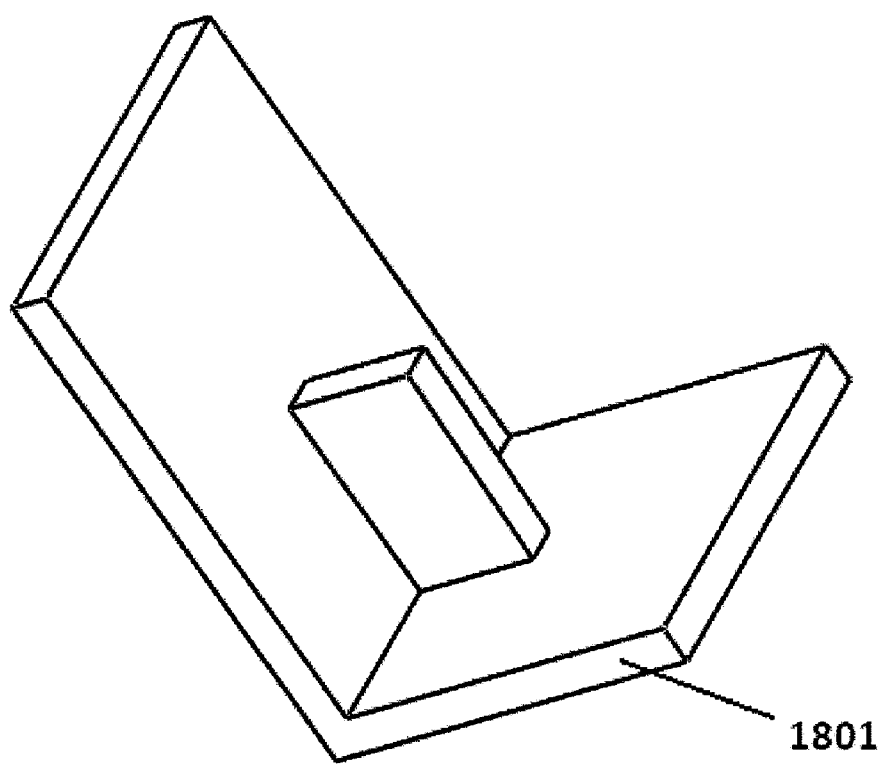
FIG. 22 and FIG. 23 are views of an ambiguous face classified as a cavity face.
Figure 23:
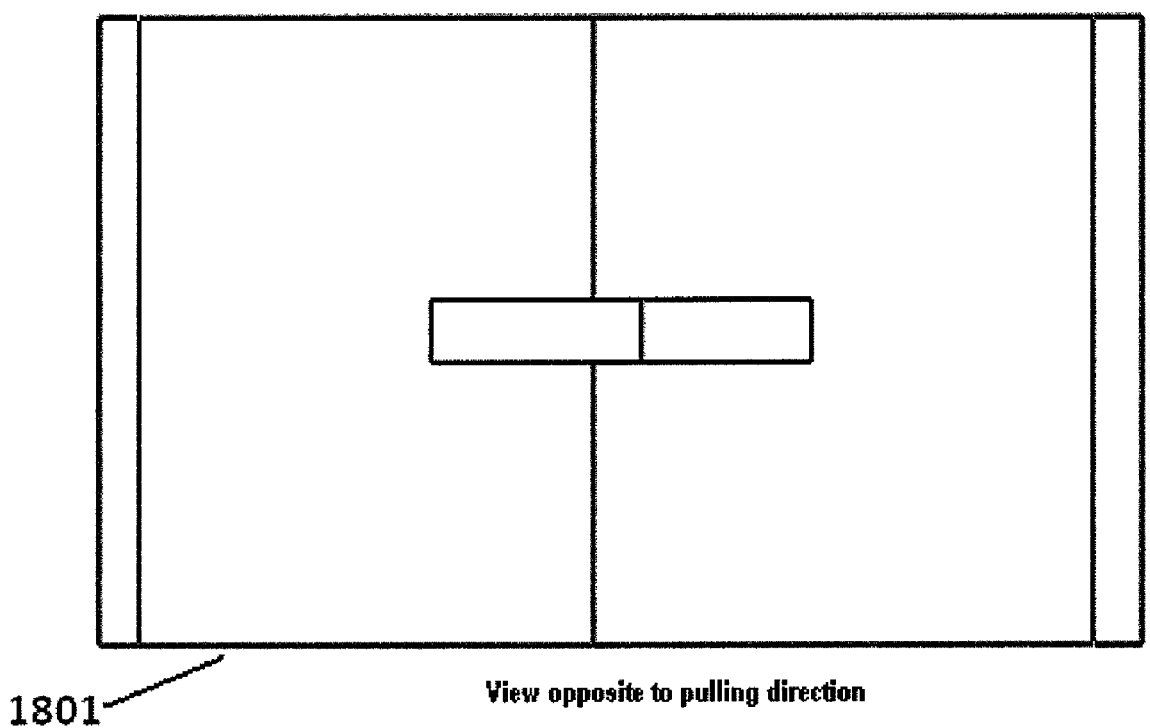

Ambiguous faces are handled as follows: Vertical faces visible on the external boundary of the model when viewed opposite to the pulling direction (and not classified as undercuts) are classified as cavity faces, such as face 1801, shown in FIG. 22 and FIG. 23. Similar ambiguous faces forming internal boundaries are classified as core faces.

Measurement of mold wall thickness is actually the measurement of clearance or air gap between two walls or faces of the component. Clearance is measured by externally fitting a rolling sphere between two faces and the distance between two contact points of sphere on the faces is measured as the clearance between two faces.

Figure 24:
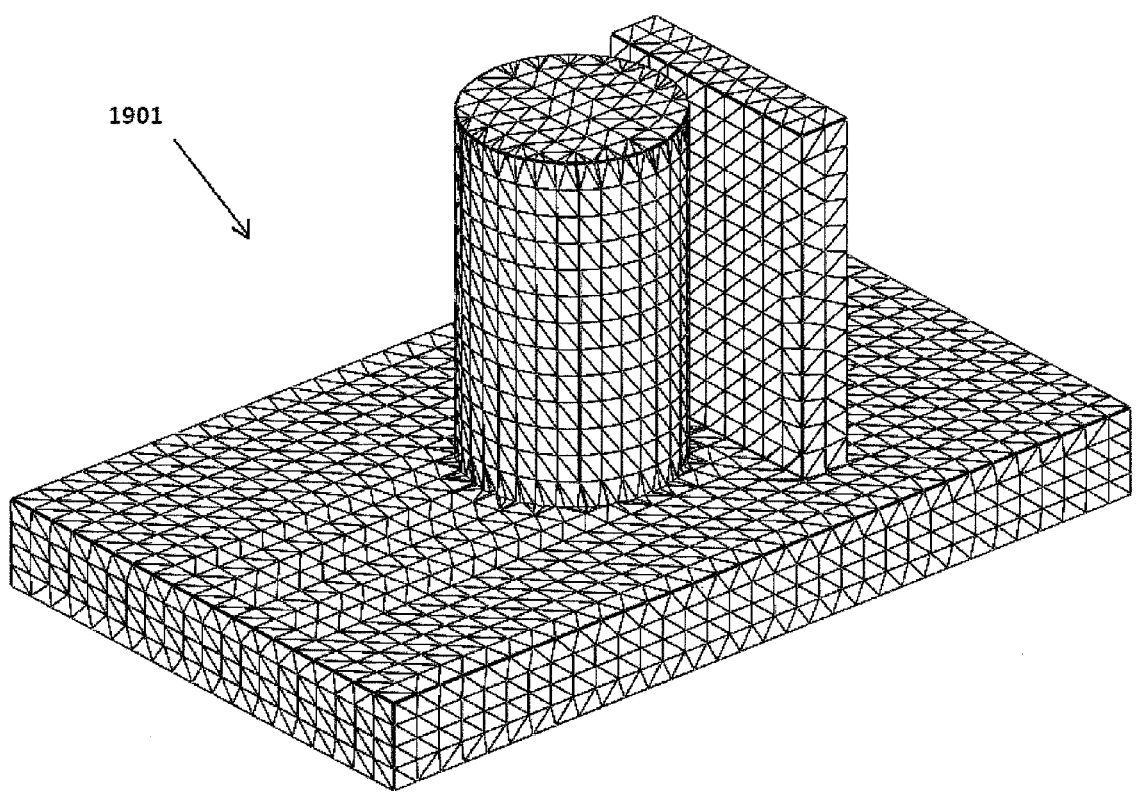
FIG. 24 is a view of a CAD model having tessellated walls for mold wall thickness calculations.

As shown in FIG. 24, the faces of a model 1901 are tessellated into small triangles. A center of each triangle is considered as a reference point for a measurement of clearance. Thus, the clearance is measured for all triangles for a particular face.

Figure 25:
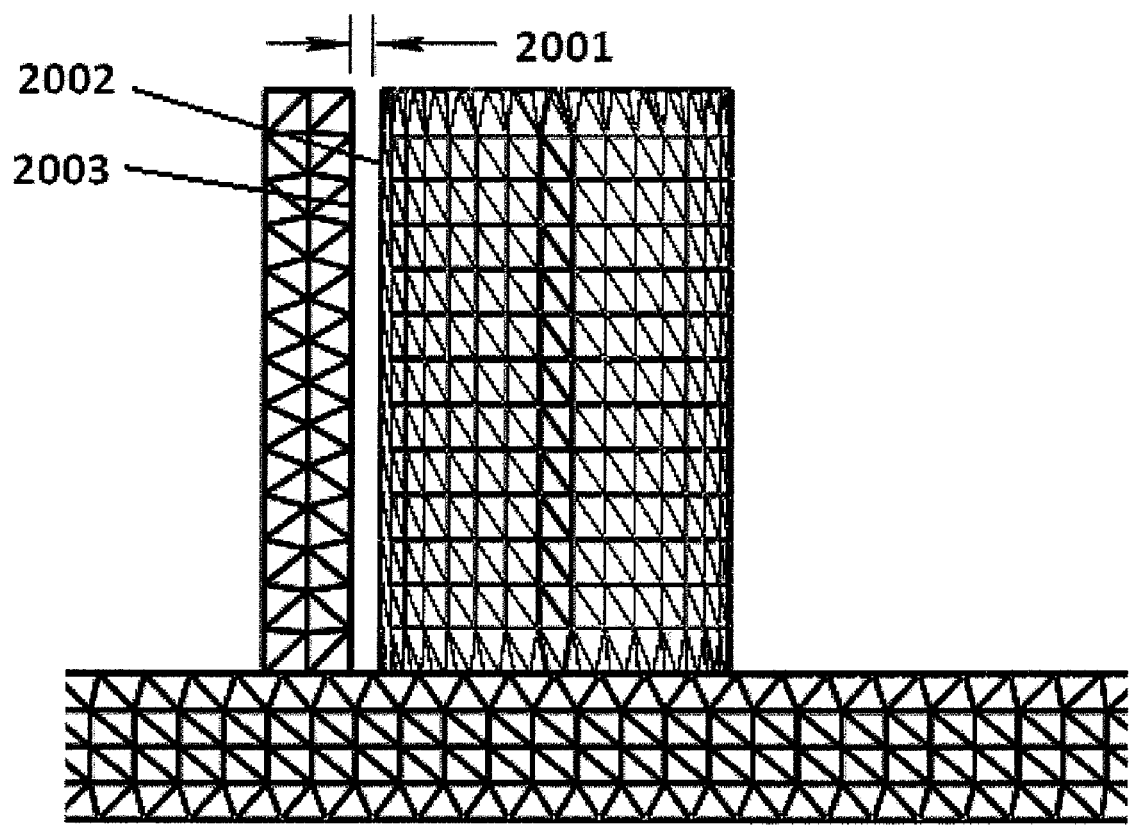
FIG. 25 is a view of the CAD model of FIG. 24 wherein a clearance between two surfaces determines the mold wall thickness.

FIG. 25 shows clearance 2001 between two surfaces 2002, 2003. The clearance 2001 determines the mold wall thickness at the particular location of the measurement.

A rolling sphere is considered such that the triangle forms a tangent surface to the sphere and sphere is external to the CAD model, the normal of the triangle passes through the center of the sphere. The sphere is grown in diameter until it touches any other triangle. As soon as a first hit is encountered, the distance between the points of contacts at the source triangle and the hit triangle is measured as the clearance between the two triangles.

Figure 26:
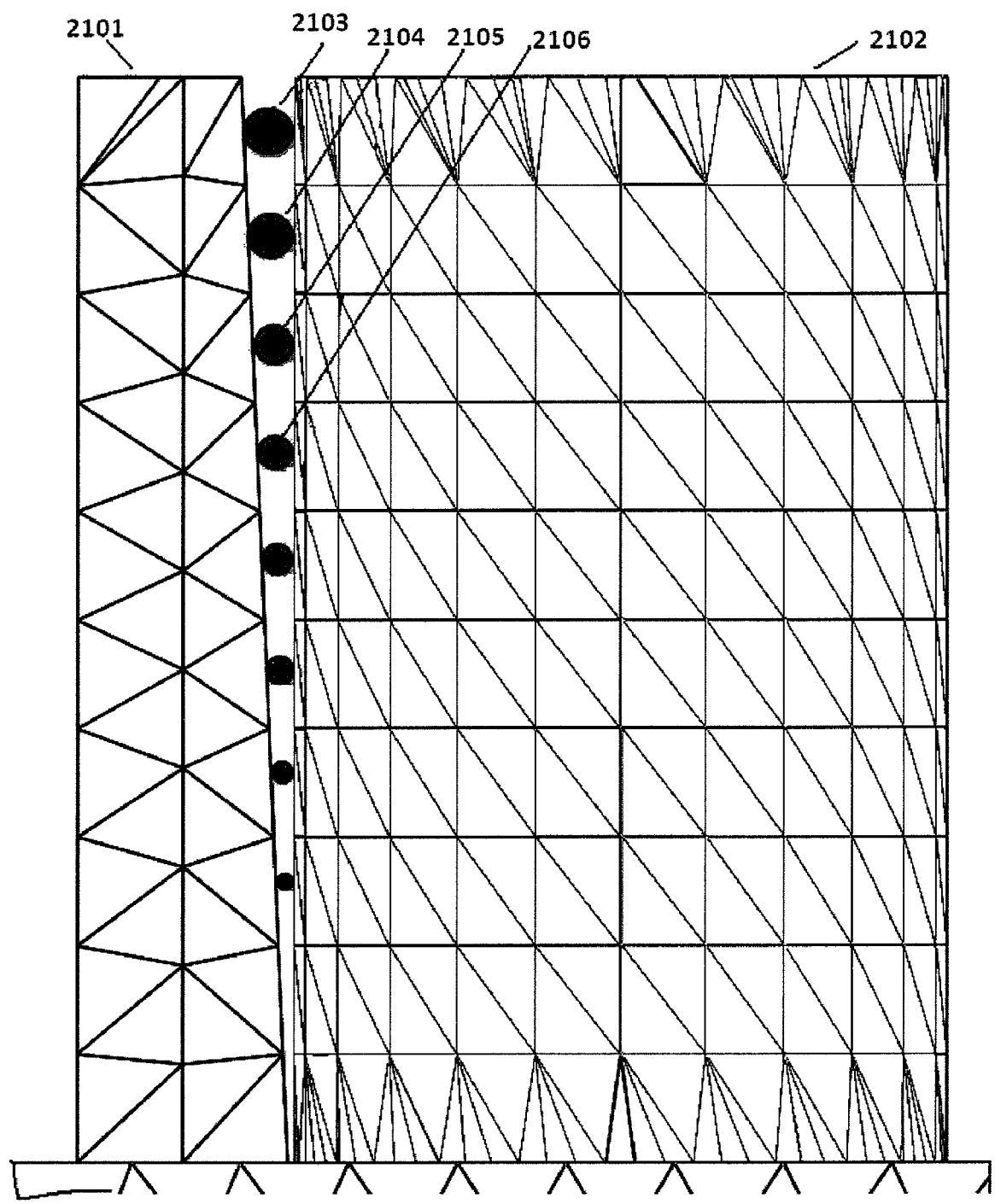
FIG. 26 is a schematic view of the CAD model of FIG. 24 showing the mold wall thickness between a rib and a boss.

FIG. 26 shows an example of computation of mold wall thickness between a rib 2101 and a boss 2102. Rolling spheres, e.g., 2103, 2104, 2105, 2106, are fit along the height of the rib 2101 and the boss 2102, and clearance is measured at those points.

Figure 27:
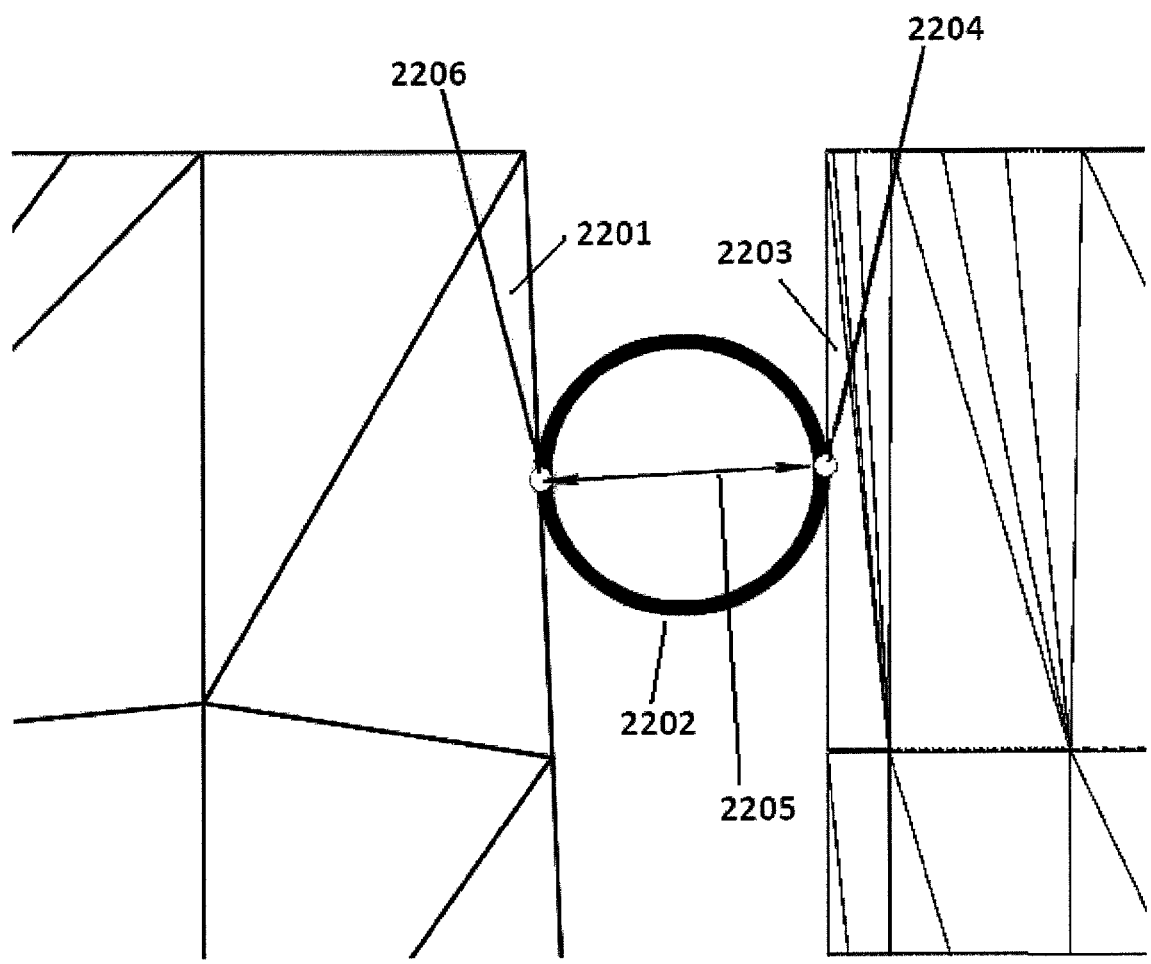
FIG. 27 is a partial schematic view of the CAD model of FIG. 24, showing one case of measurement of clearance between a triangle of the rib and the boss.

FIG. 27 shows one case of measurement of clearance between a triangle of the rib and the boss. A source triangle 2201 is a triangle on which a rolling sphere 2202 is placed. A hit triangle 2203 is a triangle which contacts the rolling sphere 2202, and a hit point 2204 is a point where the rolling sphere 2202 touches the hit triangle 2203. A clearance distance 2205 is measured as a distance between a source point 2206 where the rolling sphere 2202 contacts the source triangle 2201 and the hit point 2204.

Figure 28:
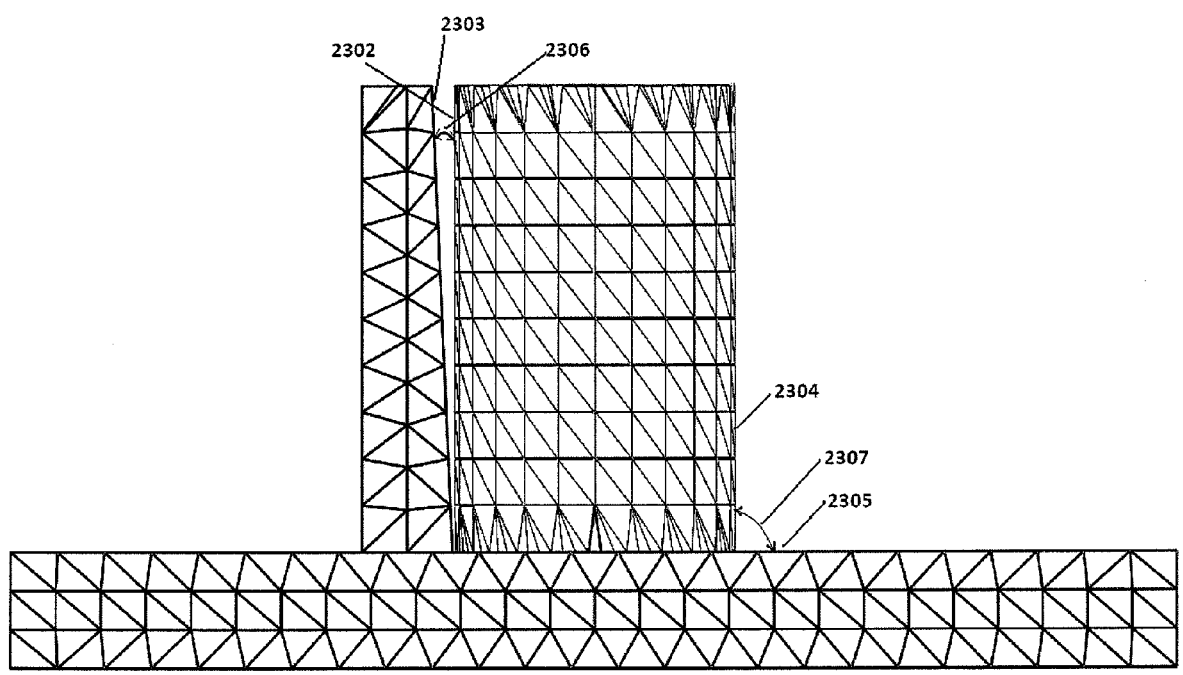
FIG. 28 is a view of the CAD model of FIG. 24 showing an angle criterion for the mold wall thickness measurement between two triangles.

As shown in FIG. 28, mold wall thickness is measured between two triangles only if normals of the triangles form a sharp angle (for example, angle 2306) between them, as in the triangles of face 2302 and face 2303. If angle between two triangles is less than or equal to a threshold value specified by user, mold wall thickness is computed else such triangles are ignored, as in the triangles of face 2304 and face 2305 and corresponding angle 2307.

Figure 29:
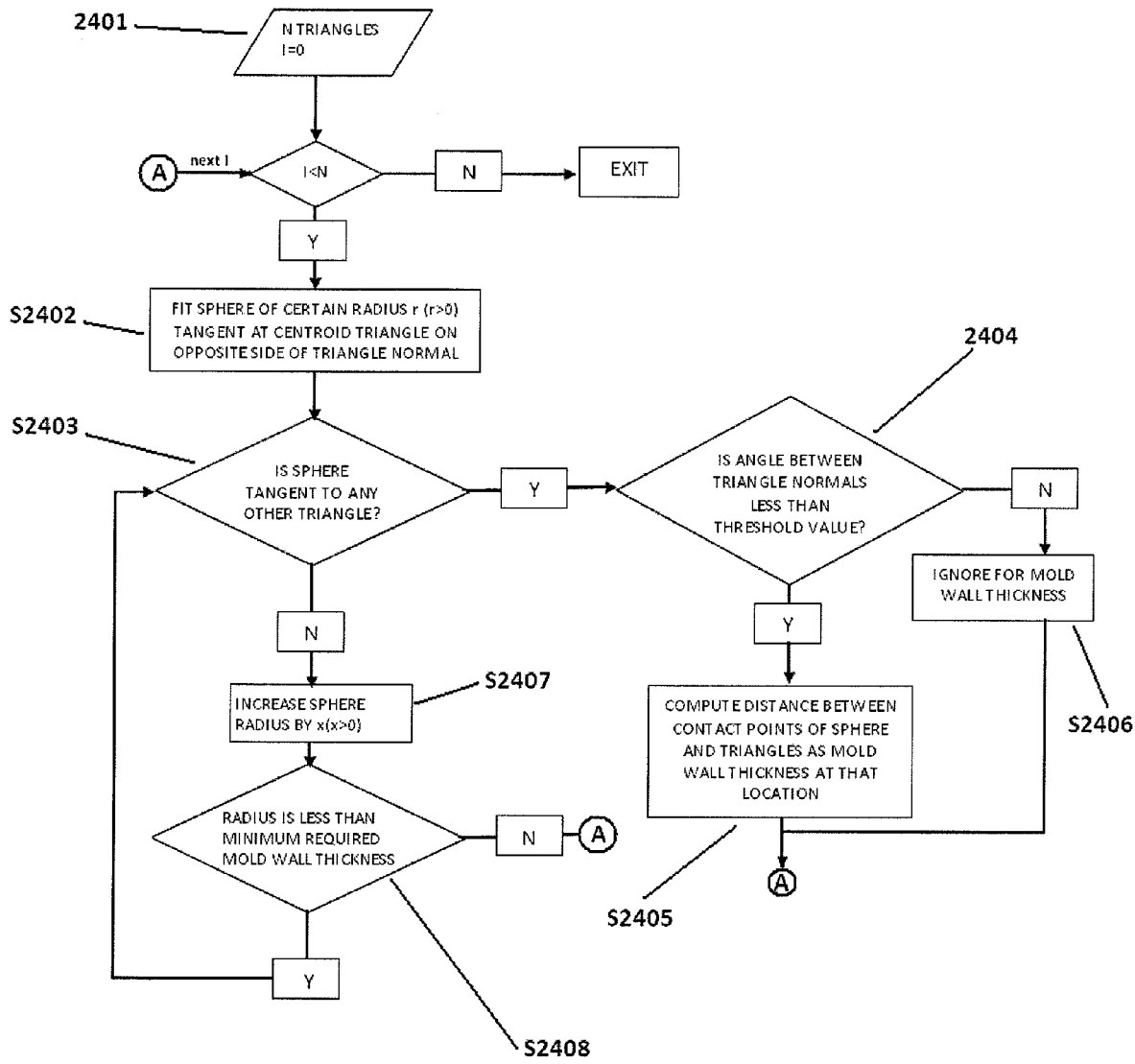
FIG. 29 is a flow chart of a method for mold wall thickness computation.

Triangles 2401 are input to the mold thickness computation process as shown in FIG. 29. For computing mold wall thickness at any location (for example, centroid of a triangle under consideration), the first step S2402 is to fit a sphere of a certain radius, r (r>0), such that it is tangent to the triangle created at that location. Triangles are created such that their normals are away from material. The sphere is fit such that it lies on the same side of the triangle normal. If the sphere is tangent to any other triangle (i.e., an affirmative result of step S2403), then another step S2404 is applied to check if the angle between the triangle normals is less than a preset value. If step S2404 gives an affirmative result, the step S2405 is applied and the mold wall thickness at that location is computed as the distance between the contact points of the sphere and the two triangles. If step S2404 provides a negative result, step S2406 is applied and mold wall thickness is not computed at that location. In case step S2403 gives a negative result, the sphere radius is increased by a small amount x (x>0) as shown in step S2407. Step S2408 checks if the new sphere radius is less than minimum required mold wall thickness. If the result is affirmative, step S2403 is repeated. The above steps are repeated for every triangle in Triangles 2401.

In response to user inputs, the DFX evaluation system 5 (FIG. 1) can set a minimum threshold value for allowable mold wall thickness on a model. If the mold wall thickness for any triangle is less than the value set by the user then the region is displayed to the user for design reconsideration.

Optionally, the mold wall thickness computation may also consider the height of the mold from the nominal wall at the point of measurement of mold wall thickness. This height along the pulling direction can be obtained by computing the distance along the negative pulling direction starting from the point of measurement of mold wall thickness to a hit cavity triangle.

Figure 30:
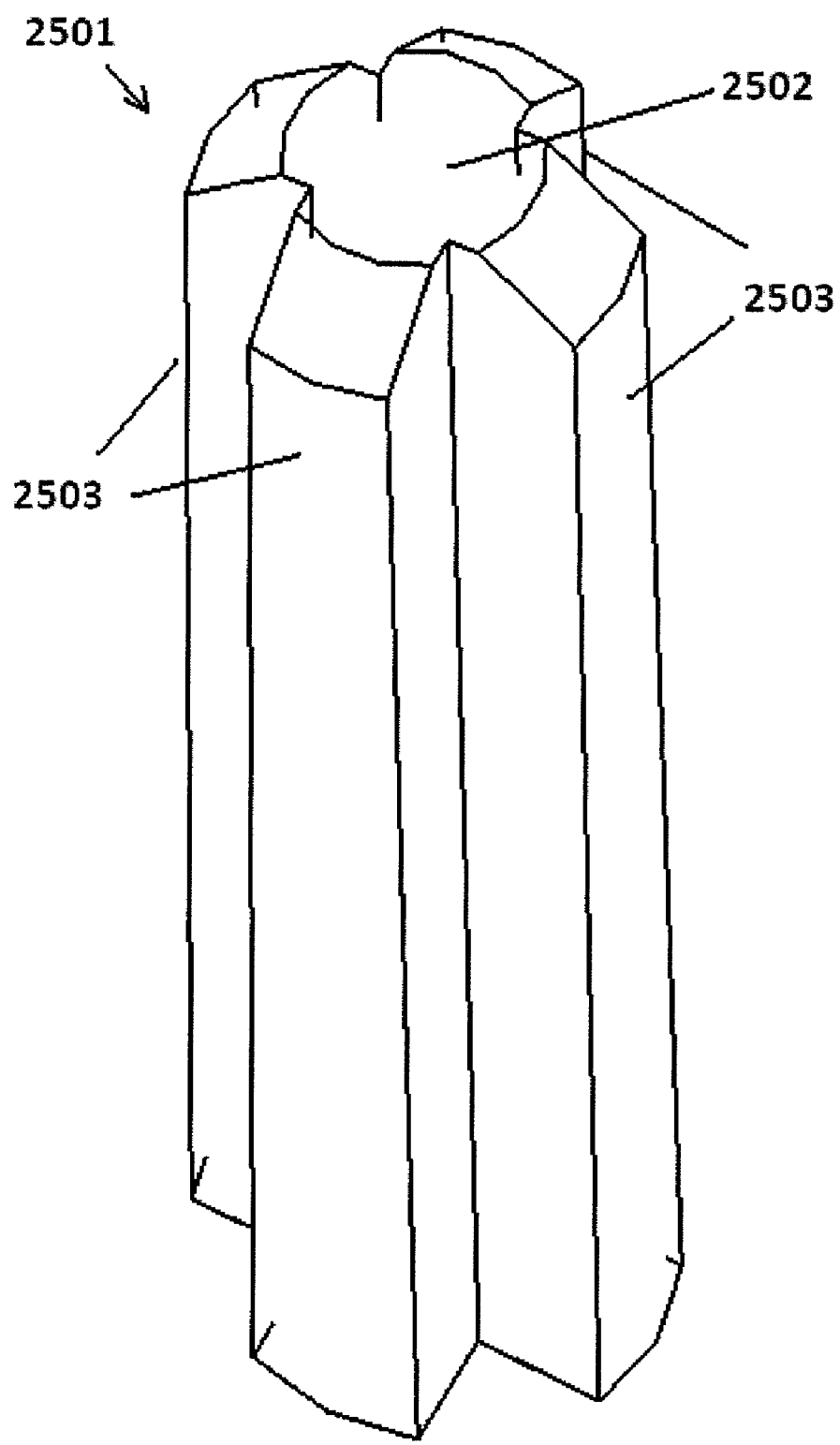
FIG. 30 is a schematic view of a CAD model of a webbed boss (pin) feature.

As shown in FIG. 30, a locating or supporting pin 2501 on a plastic model is used to provide a support or provide a location point during assembly. A pin feature consists of a central boss feature 2502 without any holes supported by ribs 2503 to provide stiffness. Thus, the locating or supporting pin 2501 forms a webbed boss kind of feature. The supporting ribs 2503 may or may not start from the tip of the locating or supporting pin 2501. In case the supporting ribs 2503 are not starting from the tip of the locating or supporting pin 2501, the tip of the locating or supporting pin 2501 should have adequate fillets.

To check the design parameters of a pin feature, one must identify the webbed boss and associated fillets. The fillets of each webbed boss can be recognized using a blend recognition algorithm disclosed in U.S. Pat. No. 6,760,038. These fillets can then be checked for minimum radius criteria. Additionally, webbed bosses can also be recognized by using the feature recognition algorithm using graph grammars disclosed in U.S. Pat. No. 7,042,451.

Figure 31:
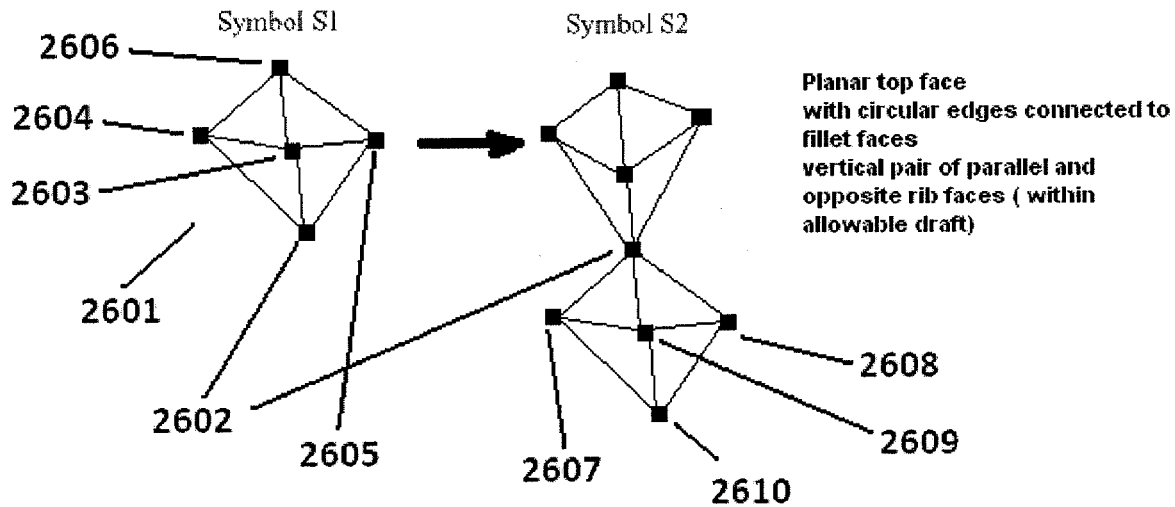
FIG. 31 is a schematic view of a graph grammar for webbed boss (pin) recognition.

Using the technique disclosed in U.S. Pat. No. 7,042,451 (the '451 patent), FIG. 31 illustrates the graph grammar based representation of a family of webbed bosses with a variable number of supporting ribs with a common top face. This figure shows the graphical representation of particular instance of this family with four supporting ribs. The starting symbol 2601 is a graph with one node 2602, representing the top face of the webbed boss, connected to a fillet face represented by 2603 and a pair of vertical opposite rib faces represented by nodes 2604 and 2605 and the remaining rib face represented by 2606. The target symbol consists of an additional pair of opposite rib faces 2607 and 2608, rib end face 2610 and fillet face 2609 which is connected to the common top face 2602 and the three rib faces. During recognition, the start symbol 2601 is first matched in the part. The rule is then applied repeatedly to collect all ribs connected to the top face (as per the recognition method detailed in the '451 patent). Attributes like edge convexity, parallelism and perpendicularity checks are used to restrict the candidate instances—for example, the two rib faces 2607 and 2608 will always be parallel to each other, top face 2609 and rib end face 2610 will be perpendicular and so on.

Once the DFX evaluation system 5 (FIG. 1) identifies the feature, the DFX evaluation system 5 (FIG. 1) checks the design parameters, such as number of ribs and fillet radii, to ensure adherence to manufacturability guidelines.

Snap-fit features provide economical, quick and easy assembly methods. Hence their use is increasing thereby replacing mechanical fasteners. Snap-fits can be designed for permanent fastening or for repeated disassembly. Snap-fit features are an environmentally-friendly form of assembly because of their easy disassembly. These features need more attention during the design stage compared to other mechanical fasteners. If not designed properly, these may fail during assembly or operations.

Figure 32:
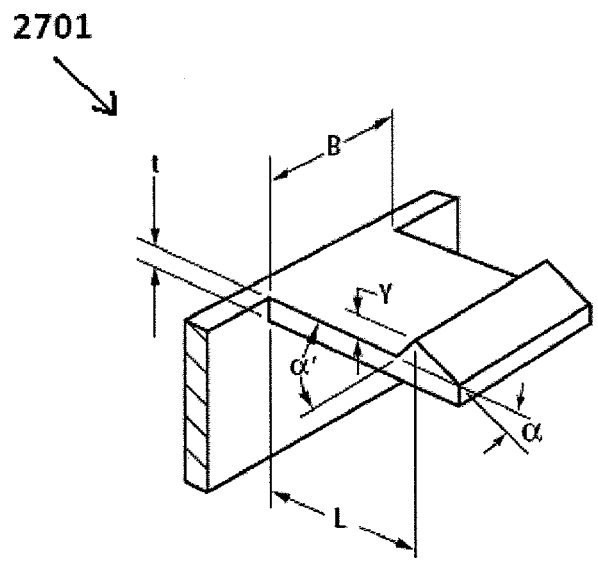
FIG. 32 is a schematic view of a cantilever snap-fit region of a part.

Many snap fit designs are possible, however the most popular are a cantilever snap-fit part 2701 (see FIG. 32) and a cylindrical (annular) snap fit part 2801 (see FIG. 33).

Parameters of the cantilever snap fit part 2801, as shown in FIG. 33, can be standardized depending on various materials, geometry parameters and loads. Based on the defined rules (for example, 106,108,110 as shown in FIG. 2), the DFX evaluation system 5 (FIG. 1) flags designs not adhering to recommended guidelines for reconsideration.

The DFX evaluation system 5 (FIG. 1) automatically recognizes such features using various analysis engines (for example, 105,107,109 as shown in FIG. 2). An exemplary feature recognition algorithm employed for such shapes is described in the aforementioned U.S. Pat. No. 7,042,451 (the '451 patent), which discloses how graph grammars can be used to recognize features on CAD models.

The DFX evaluation system 5 (FIG. 1) applies a graph based feature recognition method, as described in the '451 patent, to define a face set for the snap-fit feature which is then stored as an attributed graph. The DFX evaluation system 5 (FIG. 1) uses the attribute graph for identifying similar features in a CAD model appropriately converted to an attributed graph structure.

FIG. 34 is a graph of only those faces which form the defined shape of the snap-fit feature and a corresponding cross section of the snap fit feature showing a face set F1-F8 defining the feature. Attributes applied on the graph nodes and arcs and relations between the arcs capture the topology and geometry information of the feature shape. Attributes include edge convexity information, face geometry type, number of connections, edge parallelism to name a few. Attributes can be relaxed to allow the feature definition to be expanded depending on the application.

The DFX evaluation system 5 (FIG. 1) then uses this information, as detailed in the '451 patent to store the feature shape in an xml file, which is then loaded on request and parsed to construct the feature template. The DFX evaluation system 5 (FIG. 1) then uses the feature template to recognize snap fit features.

Once the DFX evaluation system 5 (FIG. 1) recognizes a snap fit feature, the DFX evaluation system 5 (FIG. 1) uses geometric and topological properties of the associated faces and edges to extract distances H, D, W and angles A&B, as shown in FIG. 34. The DFX evaluation system 5 (FIG. 1) then uses these parameters as parameters to the rules to check whether the snap fit is designed as per recommended guidelines.

The DFX evaluation system 5 (FIG. 1) automatically recognizes hole features using, for example, a hole recognition algorithm as described in the aforementioned U.S. Pat. No. 6,597,355 (the '355 patent).

Once the DFX evaluation system 5 (FIG. 1) recognizes holes and hole parameters such as axis, depth, diameter and taper angle using the '355 patent, rules such as minimum distance of hole from edge of model, minimum allowable distance between holes, minimum supported hole diameter, and desired ratio of hole diameter to hole depth can be verified using the hole parameters and provided CAD APIs.

Figure 35:
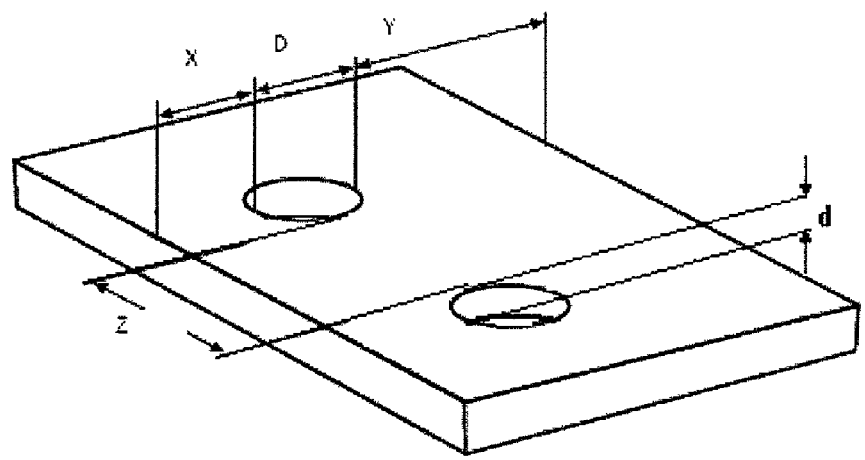
FIG. 35 is a schematic view of a CAD model showing various applicable hole dimensions computed for a rule application.

FIG. 35 shows applicable dimensions X, Y, D, Z and d computed for rule application. X, Y are distances from the edge of the model, Z is the distance between holes, D is the diameter of the hole and d is the depth of the hole.

For model wall thickness and mold wall thickness checks, the DFX evaluation system 5 (FIG. 1) primarily considers the nominal wall, since protrusions from the nominal wall like ribs, bosses and pins are thinner. To consider these variations, the DFX evaluation system 5 (FIG. 1) uses the recognized feature information to filter the rule results, thus allowing only variations in the nominal wall to be reported. Additional checks include usage of core and cavity classification. For checking model wall thickness, the DFX evaluation system 5 (FIG. 1) considers only that pair of triangles for further checks wherein one triangle belongs to core and the other triangle belongs to cavity region. For checking mold wall thickness, the DFX evaluation system 5 (FIG. 1) considers only that pair of triangles wherein both triangles belong to either a core region or a cavity region.

Figure 36:
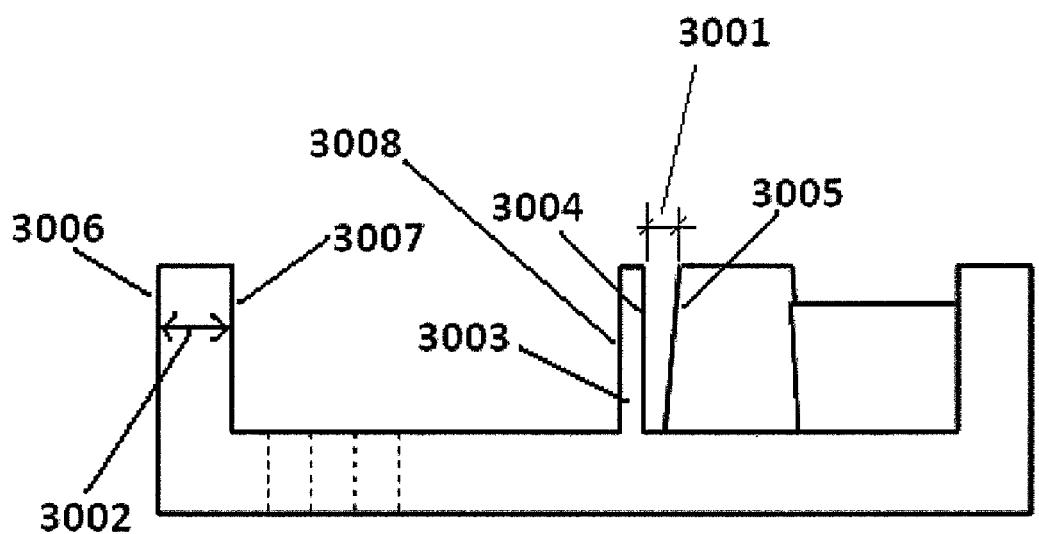
FIG. 36 is a schematic view of a CAD model showing various cases of mold wall thickness measurement.

FIG. 36 depicts a case of a mold wall thickness measurement 3001 wherein both faces 3004, 3005 belong to a core region. A case of model wall thickness measurement 3002 wherein one face 3007 belongs to core and another face 3006 belongs to cavity. A rib 3003 is thinner than the nominal wall. Additionally, both faces (3004 and 3008) of the rib 3003 belong to a core region and, hence, are not considered for nominal wall thickness rules. The DFX evaluation system 5 (FIG. 1) applies different thickness rules for features such as ribs and bosses recognized by analysis engines as explained in [0054]

One difference between creating a model using injection molding versus creating the same model using machining is that the machining volumes are reversed. This is primarily because in the case of injection molding, the mold is machined. Hence, a rib in a model becomes a pocket in the mold. Consequently, the DFX evaluation system 5 (FIG. 1) considers the mold machining aspect in the manufacturability aspects for injection molding. Sharp corners, non-standard fillet radii applied on features or too-deep pockets may necessitate procurement of special tools or may require adoption of more expensive processes like EDM (electro-discharge machining).

The DFX evaluation system 5 (FIG. 1) identifies sharp corners in a model by using edge convexity information of the model edges. The DFX evaluation system 5 (FIG. 1) identifies fillets and chamfers using a fillet recognition algorithm disclosed in U.S. Pat. No. 6,760,038. The DFX evaluation system 5 (FIG. 1) considers only those linear edges and extruded fillets which are not perpendicular to the pulling direction.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for evaluating ease of manufacturability for a three-dimensional injection molded plastic computer-aided-design (CAD) model, comprising:
   generating, by a first program module running on a computing machine, a likely pulling direction for the CAD model using a plurality of heuristics;
   identifying, by the first program module, core, cavity and undercut regions in the CAD model based on the likely pulling direction;
   computing, by a second program module running on the computing machine, wall thickness parameters of the CAD model and wall thickness parameters of a corresponding mold using geometry information of the CAD model;

recognizing, by a third program module running on the computing machine, form features in the CAD model;

computing, by the third program module, parameters of the form features in the CAD model;

storing in a feature database the wall thickness parameters, the form features, and the parameters of the form features; and applying, by a fourth program module running on the computing machine, a plurality of manufacturability rules stored in a rule database, the manufacturability rules being based on the form features and the parameters of the form features, thereby evaluating ease of manufacturability of the CAD model.

2. The method according to claim 1, wherein step of generating a likely pulling direction for the CAD model using the plurality of heuristics further comprises:

using feature recognition algorithms to recognize a plurality of ribs and boss features on the CAD model;

computing mid planes of the ribs;

computing axes of the boss features; and identifying and returning an axis as a likely pulling direction such that the axis is the most commonly occurring axis of the said boss features or the axis is along the normal of the plane defined by the normals of mid-planes of the rib features.

3. The method according to claim 1, wherein the step of identifying core, cavity and undercut regions further comprises:

using CAD APIs to tessellate the CAD model and generate connected sets of triangles on faces of the CAD model, the triangles being inwardly oriented from the CAD model;

firing rays along and opposite to the likely pulling direction from the triangles;

finding obstructed rays as rays which intersect other triangles;

separating the faces of the CAD model into vertical faces and non-vertical faces;

classifying the non-vertical faces as core, cavity or undercut regions;

Identifying as core regions those sets of connected triangles each of which has obstructed rays only in a negative pulling direction;

identifying as cavity regions those sets of connected triangles each of which has obstructed rays only in the likely pulling direction;

identifying as undercut regions those sets of connected triangles each of which has obstructed rays in the negative pulling direction and in the likely pulling direction;

identifying vertical faces completely surrounded by core regions as core faces and vertical faces completely surrounded by cavity regions as cavity faces; and identifying vertical faces visible on an external boundary of the CAD model when viewed along the likely pulling direction as cavity faces and vertical faces on an internal boundary of the CAD model as core faces.

4. The method according to claim 1, wherein the steps of computing wall thickness parameters of the CAD model and applying the plurality of manufacturability rules stored in the rule database further comprise:

using CAD APIs to tessellate the CAD model and generate connected sets of triangles on faces of the CAD model, said triangles being inwardly oriented from the CAD model;

for each triangle, determining a point inside and lying on the triangle, and fitting a largest sphere tangent to the triangle at the point, not intersecting with any other triangle of the CAD model, in a side of the triangular normal and tangent to at least one other triangle, thereby constructing pairs of triangles;

computing wall thickness parameters of the CAD model as a distance between points of contact of the largest sphere and the pair of triangles;

including model wall thickness checks for those pairs of the pairs of triangles in which one triangle belongs to a core region and the other triangle belongs to a cavity region;

excluding ribs, bosses, and other purely core features and purely cavity features from the model wall thickness checks; and identifying thin areas, thick areas, and variation in wall thickness areas.

5. The method according to claim 1, wherein the steps of computing wall parameters of a corresponding mold and applying the plurality of manufacturability rules stored in the rule database further comprise:

using CAD APIs to tessellate the CAD model and generate connected sets of triangles on faces of the CAD model, said triangles being outwardly oriented from the CAD model;

for each given triangle, determining a center of the triangle, and fitting a largest sphere tangent to the triangle at the center, not intersecting with any other triangle of the CAD model, in a side of the triangular normal and tangent to at least one other triangle, thereby constructing pairs of triangles;

computing wall thickness parameters of the corresponding mold as a distance between the points of contact of the largest sphere and the said pair of triangles;

including mold wall thickness checks for those of the pairs of triangles such that both triangles of the pairs of triangles belong to one of a core region and a cavity region; and checking if the wall thickness parameters of the corresponding mold are greater than a required minimum value.

6. The method according to claim 1, wherein pin features and webbed boss features are identified using the third program module and checked against the plurality of manufacturability rules stored in the rule database, the method further comprising:

using feature recognition algorithms for identification of the pin features and the webbed boss features;

checking for adequate fillet radii at a tip of the webbed boss features using a fillet feature recognition algorithm; and checking for adequate supporting ribs in the pin features using predetermined guidelines.

7. The method according to claim 1, wherein snap-fit features are identified using the third program module and checked against the plurality of manufacturing rules stored in the rules database, the method further comprising:

identifying the snap-fit features using feature recognition algorithms;

extracting parameters of the snap-fit features using geometric and topological properties; and checking for a maximum allowable extent of undercut value, and a maximum allowable height to diameter ratio.

8. The method according to claim 1, wherein hole features in the CAD model are identified using the third program module and checked against the plurality of manufacturing rules stored in the rules database, the method further comprising:

identifying the hole features using feature recognition algorithms;

extracting parameters of the hole features using geometric and topological properties; and checking for a minimum allowable distance from edge of model, a minimum distance between holes, a minimum hole diameter, and a hole diameter to depth ratio.

9. A method according to claim 1, wherein features in the CAD model requiring one of special tooling and EDM processes are identified and checked against the plurality of manufacturability rules stored in the rules database, the method further comprising:

identifying fillets and sharp corners using feature recognition algorithms;

including for checks only those sharp corners and fillets which are not perpendicular to the likely pulling direction; and checking for sharp corners and small fillet radii based on fillet parameters returned by the feature recognition algorithms.

* * * * *